United States Patent
Liu et al.

(10) Patent No.: US 9,088,351 B2
(45) Date of Patent: Jul. 21, 2015

(54) PHYSICAL LAYER NETWORK CODING USING FORWARD ERROR CORRECTION CODES

(75) Inventors: Weimin Liu, Chatham, NJ (US); Rui Yang, Greenlawn, NY (US); Philip J. Pietraski, Huntington Station, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 14/005,730

(22) PCT Filed: Mar. 16, 2012

(86) PCT No.: PCT/US2012/029477
§ 371 (c)(1),
(2), (4) Date: Nov. 25, 2013

(87) PCT Pub. No.: WO2012/125943
PCT Pub. Date: Sep. 20, 2012

(65) Prior Publication Data
US 2014/0086283 A1   Mar. 27, 2014

Related U.S. Application Data

(60) Provisional application No. 61/453,793, filed on Mar. 17, 2011.

(51) Int. Cl.
| | |
|---|---|
| H04B 15/00 | (2006.01) |
| H04B 7/155 | (2006.01) |
| H04L 1/00 | (2006.01) |
| H04B 7/15 | (2006.01) |

(52) U.S. Cl.
CPC .................. *H04B 15/00* (2013.01); *H04B 7/15* (2013.01); *H04B 7/15521* (2013.01); *H04L 1/0076* (2013.01)

(58) Field of Classification Search
USPC ......... 375/140, 141, 146, 147, 211, 219, 260, 375/267, 299, 316, 340, 347, 349
See application file for complete search history.

(56) References Cited

U.S. PATENT DOCUMENTS

| | | | |
|---|---|---|---|
| 8,065,586 B2 * | 11/2011 | Miyoshi et al. | 714/752 |
| 8,165,521 B2 * | 4/2012 | Kim et al. | 455/7 |
| 2010/0284446 A1 * | 11/2010 | Mu et al. | 375/211 |

FOREIGN PATENT DOCUMENTS

EP        2264929 A1    12/2010

OTHER PUBLICATIONS

Ahlswede et al., "Network Information Flow", IEEE Transactions on Information Theory, vol. 46, No. 4, Jul. 2000, 13 pages.
(Continued)

*Primary Examiner* — Dac Ha
(74) *Attorney, Agent, or Firm* — Condo Roccia Koptiw LLP

(57) ABSTRACT

Two network nodes may exchange messages through a relay using physical-layer network coding combined with forward error correction coding (FEC). The relay determines a prime field order based on the channel condition and communicates the field order to the network nodes. Each network node encodes an outgoing message with linear codes over a field such as finite field of the field order, and transmits a signal carrying the encoded outgoing message. The relay receives a composite signal carrying the summation of the messages from the two network nodes. The relay decodes the composite signal and extracts a composite message with linear codes over finite field of field order, and broadcasts a signal carrying the composite message. Each network node receives the signal from the relay and extracts the message intended for it using linear subtraction over finite field of field order.

31 Claims, 26 Drawing Sheets

(56) References Cited

OTHER PUBLICATIONS

Katti et al., "XORs in the Air: Practical Wireless Network Coding", SIGCOMM'06, Sep. 11-15, 2006, Pisa, Italy, 12 pages.

Nazer et al, "Compute-and-Forward: Error-Correcting Codes for Wireless Network Coding on the Physical Layer", IEEE Institute of Electrical and Electronic Engineers, Jun. 16-20, 2008, San Francisco, California, 5 pages.

Zhang et al., "Hot Topic: Physical-Layer Network Coding", MobiCom'06, Sep. 23-26, 2006, Los Angeles, California 8 pages.

\* cited by examiner

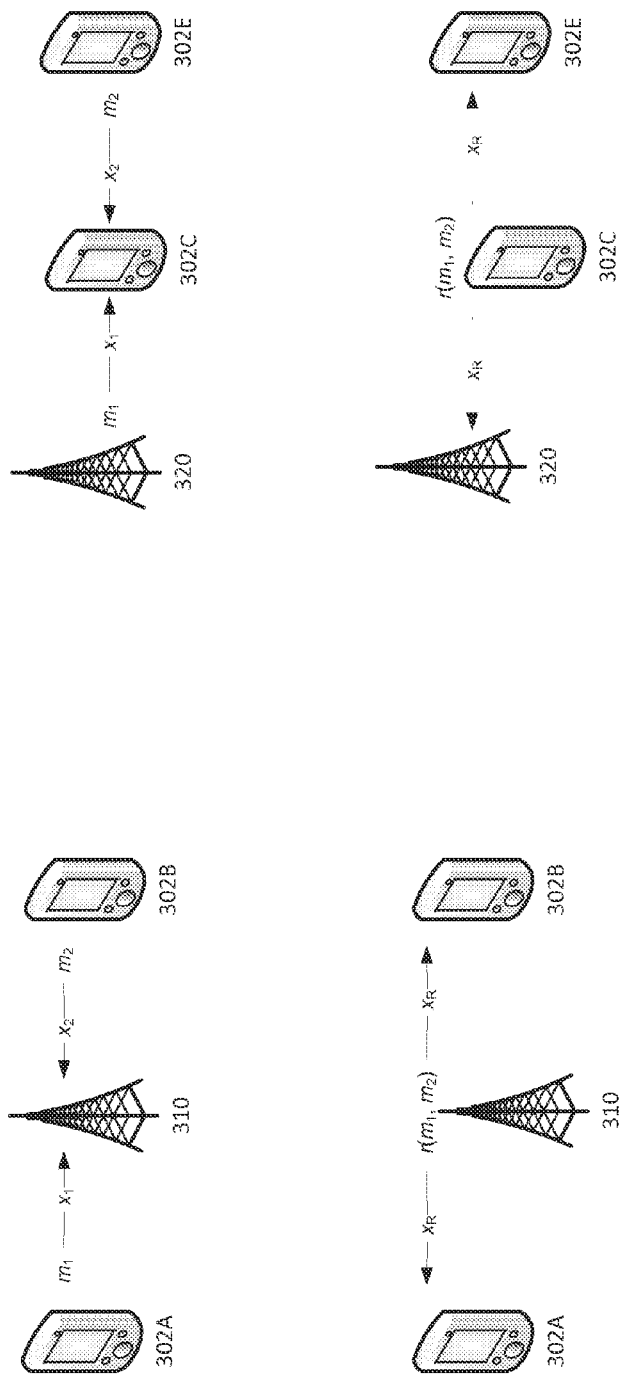

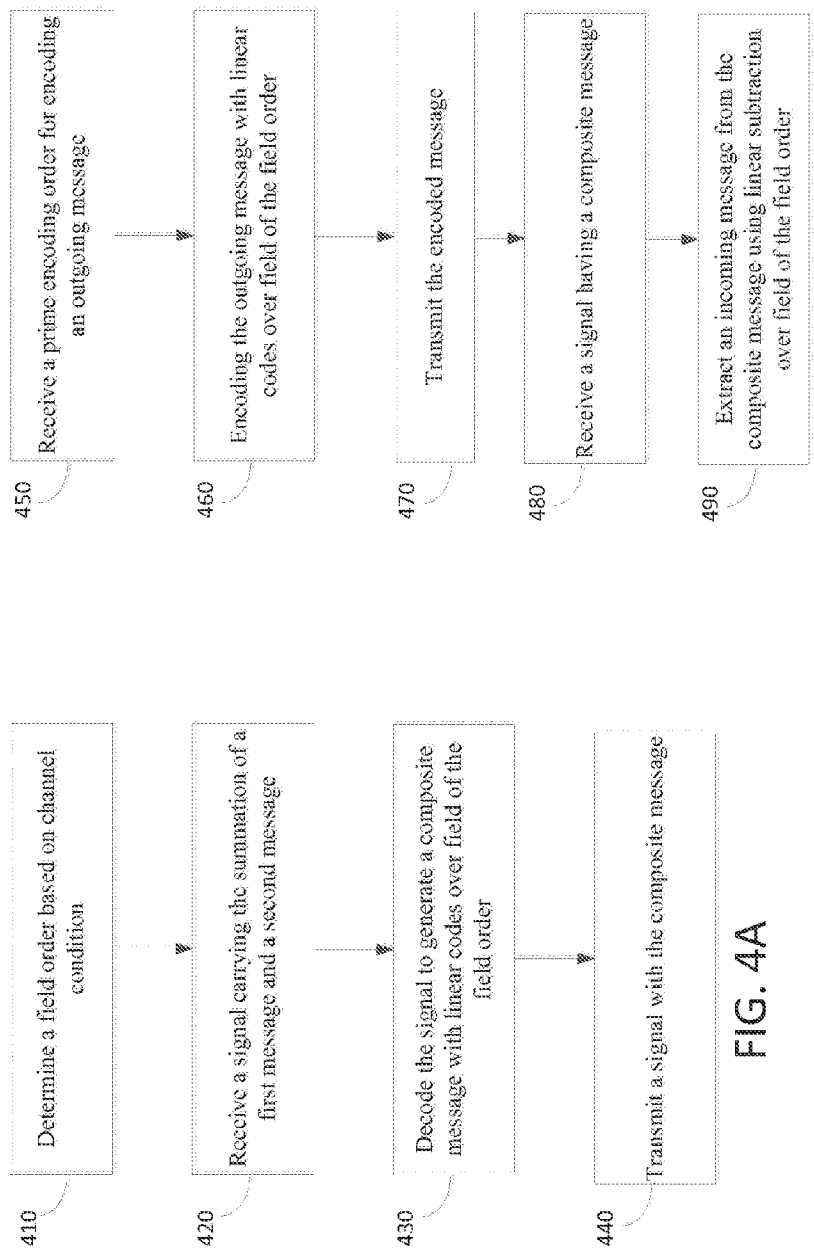

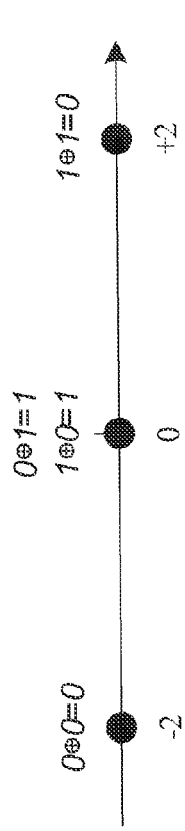
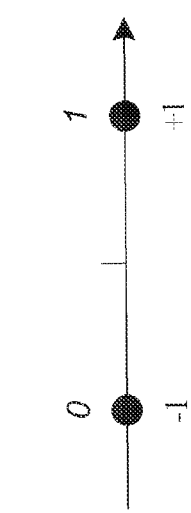
FIG. 6
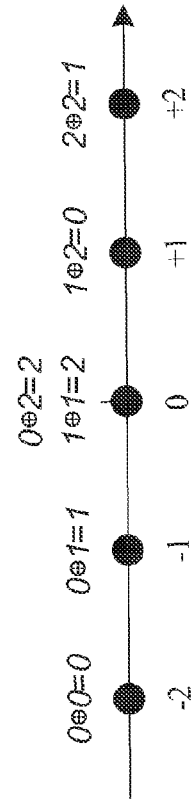
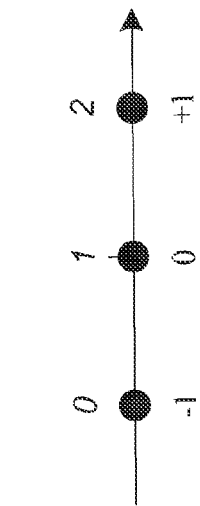
FIG. 7

PHYSICAL LAYER NETWORK CODING USING FORWARD ERROR CORRECTION CODES

CROSS-REFERENCE TO RELATED APPLICATIONS

This application claims the benefit of U.S. provisional application No. 61/453,793, filed Mar. 17, 2011, which is hereby incorporated by reference herein.

BACKGROUND

A wireless communication network may deploy a two-way relay to enable two nodes, which may not be able to communicate with each other otherwise, to exchange data. Physical layer network coding (PNC) can be used to improve the efficiency and/or capacity of a relaying scheme.

An example approach for relaying, often referred to as "amplify-and-forward," may be able to not decode the signals from the two nodes. The relay may simply broadcast the summation of the signals received from the two nodes together with the noise seen by the relay, subject to some power constraint. Each of the two nodes can decode the data intended for it by performing echo cancellation and channel decoding. However, performance may be limited in this approach because the power used for transmitting the summation of the signals from the two nodes may be twice as high as conventional transmission. In addition, the noise at the relay may be amplified and forwarded to the receiving nodes.

SUMMARY

Methods and apparatuses are provided for exchanging messages via a two-way relay using physical-layer network coding combined with forward error correction coding (FEC).

In an embodiment, two network nodes may exchange messages through a relay. The relay may determine a prime number to be the field order q for physical-layer network coding. For example, the field order may be determined based on the channel condition such as signal to noise ratio or signal to interference and noise ratio. A trellis or turbo code defined on a field of order q may be chosen as the FEC scheme. The field order may be communicated to the network nodes.

Each network node may encode an outgoing message with linear codes over a field such as finite field of field order q, and may transmit a signal carrying the encoded outgoing message. When the two network nodes send messages simultaneously, the relay may receive a composite signal carrying the summation of the messages from the two network nodes. The relay may remove the noise from the composite signal by decoding the composite signal and may extract a composite message with linear codes over the field of field order q. The relay may transmit a signal carrying the composite message. Each network node may receive the signal from the relay, and may extract the message intended for it using linear subtraction over finite field of field order q. For example, a network node may subtract its outgoing message from the composite message to derive the message originated from the other network node.

In an embodiment, when the channel gains from the network nodes to the relay are substantially the same, the relay may decode the summation of the messages from the two network nodes. When the channel gains from the network nodes to the relay are significantly different, e.g., the difference exceeding a predetermined threshold, successive interference cancellation (SIC) may be used to separately decode the two messages from the network nodes. Any capacity-achieving coding and modulation scheme may be used to broadcast signal carrying the composite message.

The Summary is provided to introduce a selection of concepts in a simplified form that are further described below in the Detailed Description. This Summary is not intended to identify key features or essential features of the claimed subject matter, not is it intended to be used to limit the scope of the claimed subject matter. Furthermore, the claimed subject matter is not limited to any limitations that solve any or all disadvantages noted in any part of this disclosure.

BRIEF DESCRIPTION OF THE DRAWINGS

A more detailed understanding may be had from the following description, given by way of example in conjunction with the accompanying drawings.

FIG. 3A is a diagram of an example system employing network coding scheme over a two-way relay.

FIG. 3B illustrates an example system employing network coding scheme over a helper WTRU.

FIGS. 4A and 4B illustrate example procedures for relaying message exchange between two network entities.

FIG. 6 shows an example constellation and superposition.

FIG. 7 illustrates example constellation and superposition of two 3PAM (pulse amplitude modulation).

DETAILED DESCRIPTION OF ILLUSTRATIVE EMBODIMENTS

Figure 1A:
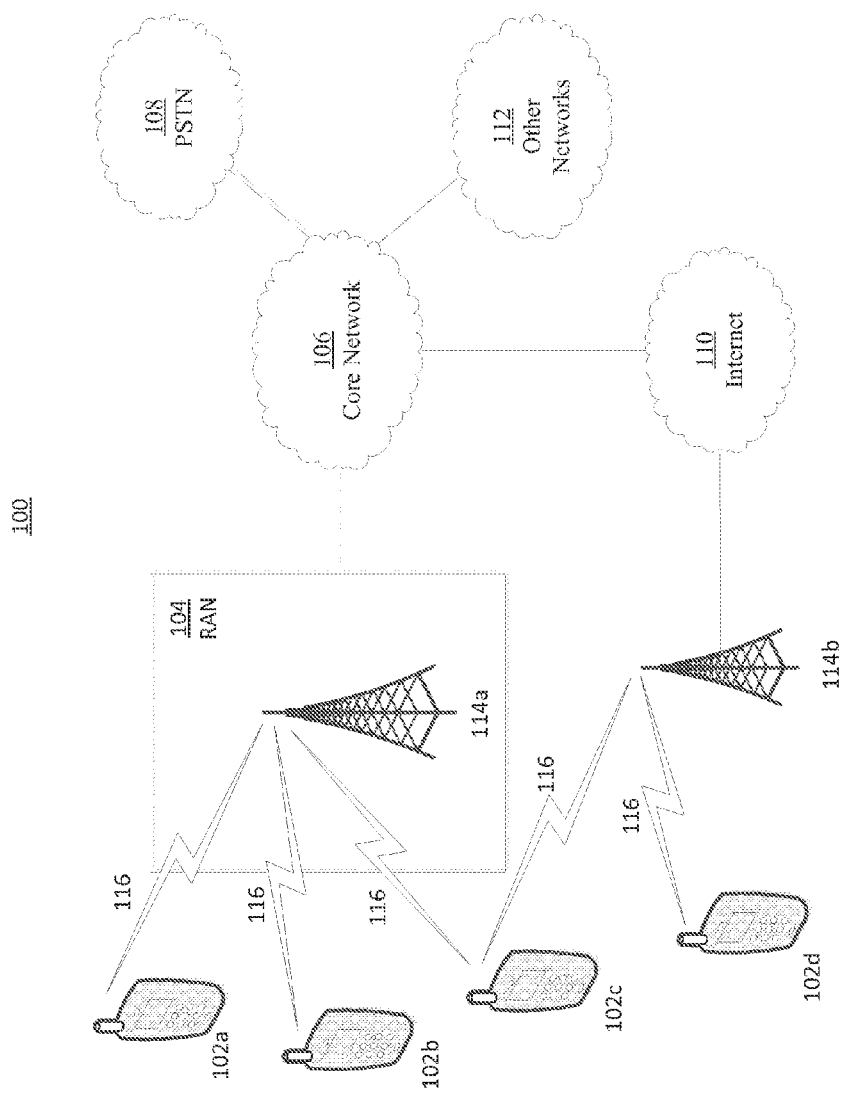
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in an embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or AP, for example, and may utilize any suitable RAT for facilitating wireless connectivity in a localized area, such as a place of business, a home, a vehicle, a campus, and the like. In an embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The core network 106 may include at least one transceiver and at least one processor. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
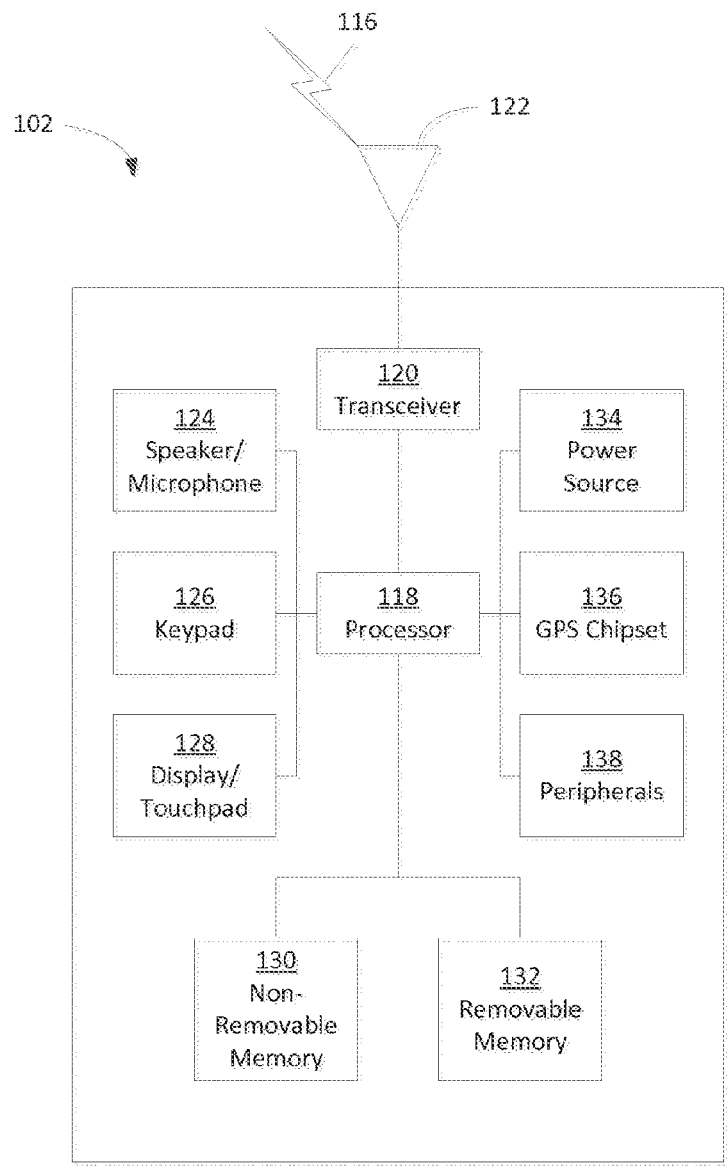
FIG. 1B is a system diagram of an example wireless transmit and receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in an embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in an embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
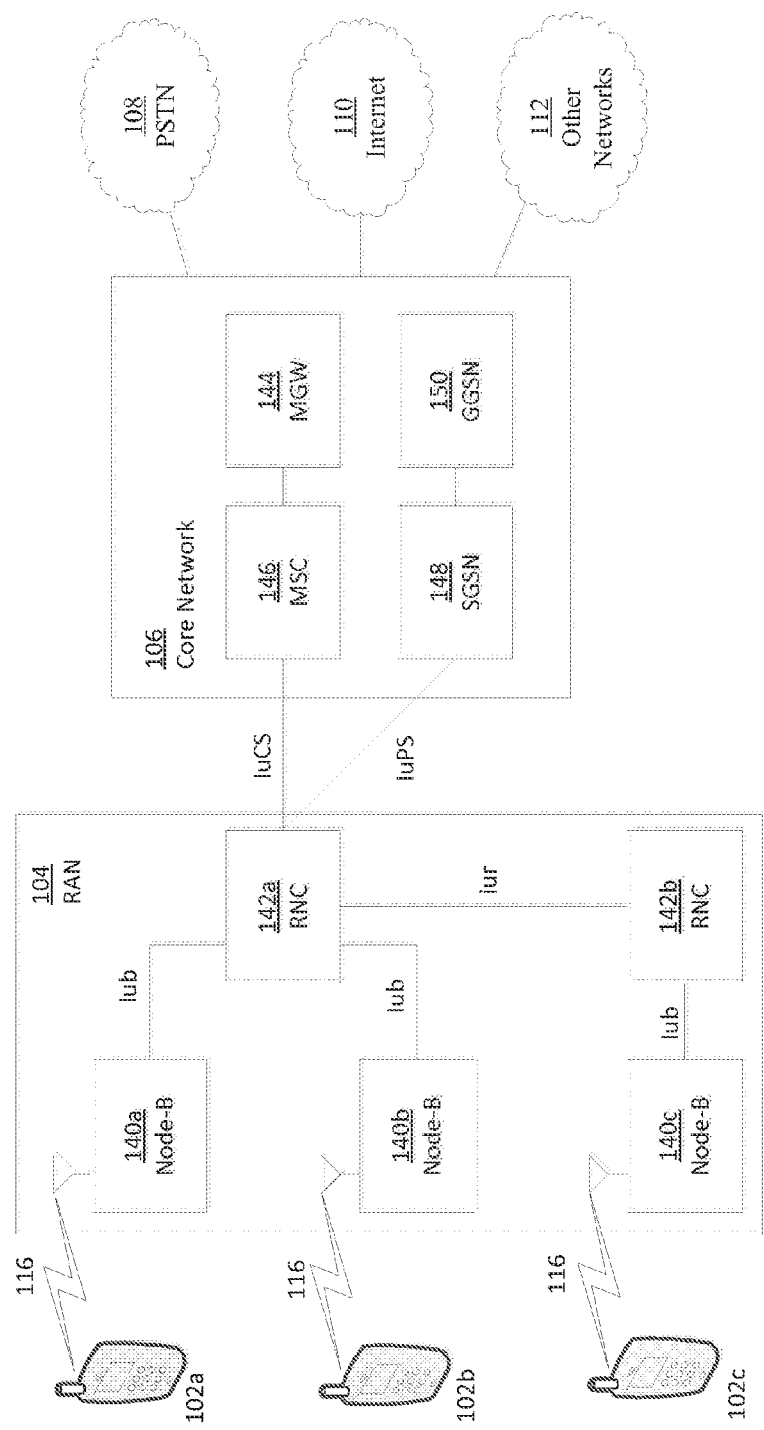
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ a UTRA radio technology to communicate with the WTRUs 102a, 102b and 102c over the air interface 116. The RAN 104 may also be in communication with the core network 106. As shown in FIG. 1C, the RAN 104 may include Node-Bs 140a, 140b, 140c, which may each include one or more transceivers for communicating with the WTRUs 102a, 102b, 102c over the air interface 116. The Node-Bs 140a, 140b, 140c may each be associated with a particular cell (not shown) within the RAN 104. The RAN 104 may also include RNCs 142a, 142b. It will be appreciated that the RAN 104 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 104 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 104 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
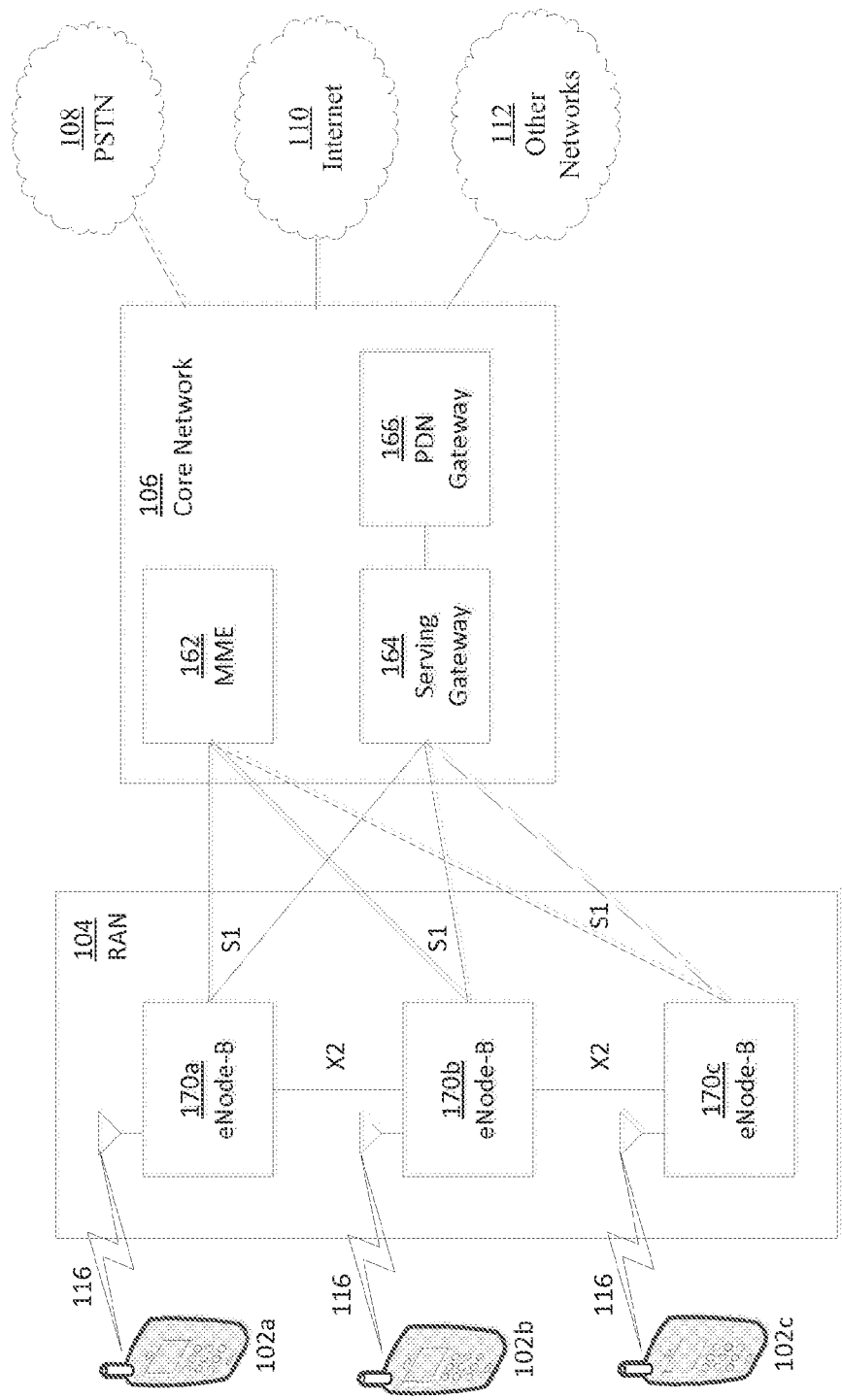
FIG. 1D is a system diagram of an example radio access network and an example core network that may be used within the communications system illustrated in FIG. 1A.

FIG. 1D is a system diagram of the RAN 104 and the core network 106 according to an embodiment. As noted above, the RAN 104 may employ an E-UTRA radio technology to communicate with the WTRUs 102a, 102b and 102c over the air interface 116. The RAN 104 may also be in communication with the core network 106.

The RAN 104 may include eNode-Bs 170a, 170b and 170c, though it will be appreciated that the RAN 104 may include any number of eNode-Bs while remaining consistent with an embodiment. The eNode-Bs 170a, 170b, 170c may each include one or more transceivers for communicating with the WTRUs 102a, 102b, 102c over the air interface 116. In an embodiment, the eNode-Bs 170a, 170b, 170c may implement MIMO technology. Thus, the eNode-B 140a, for example, may use multiple antennas to transmit wireless signals to, and receive wireless signals from, the WTRU 102a.

Each of the eNode-Bs 170a, 170b and 170c may be associated with a particular cell (not shown) and may be configured to handle radio resource management decisions, handover decisions, scheduling of users in the uplink and/or downlink, and the like. As shown in FIG. 1D, the eNode-Bs 170a, 170b, 170c may communicate with one another over an X2 interface.

The core network (CN) 106 shown in FIG. 1D may include a mobility management gateway (MME) 162, a serving gateway 164, and a packet data network (PDN) gateway 166. While each of the foregoing elements are depicted as part of the core network 106, it will be appreciated that any one of these elements may be owned and/or operated by an entity other than the core network operator.

The MME 162 may be connected to each of the eNode-Bs 170a, 170b and 170c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode Bs 170a, 170b, 170c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Figure 1E:
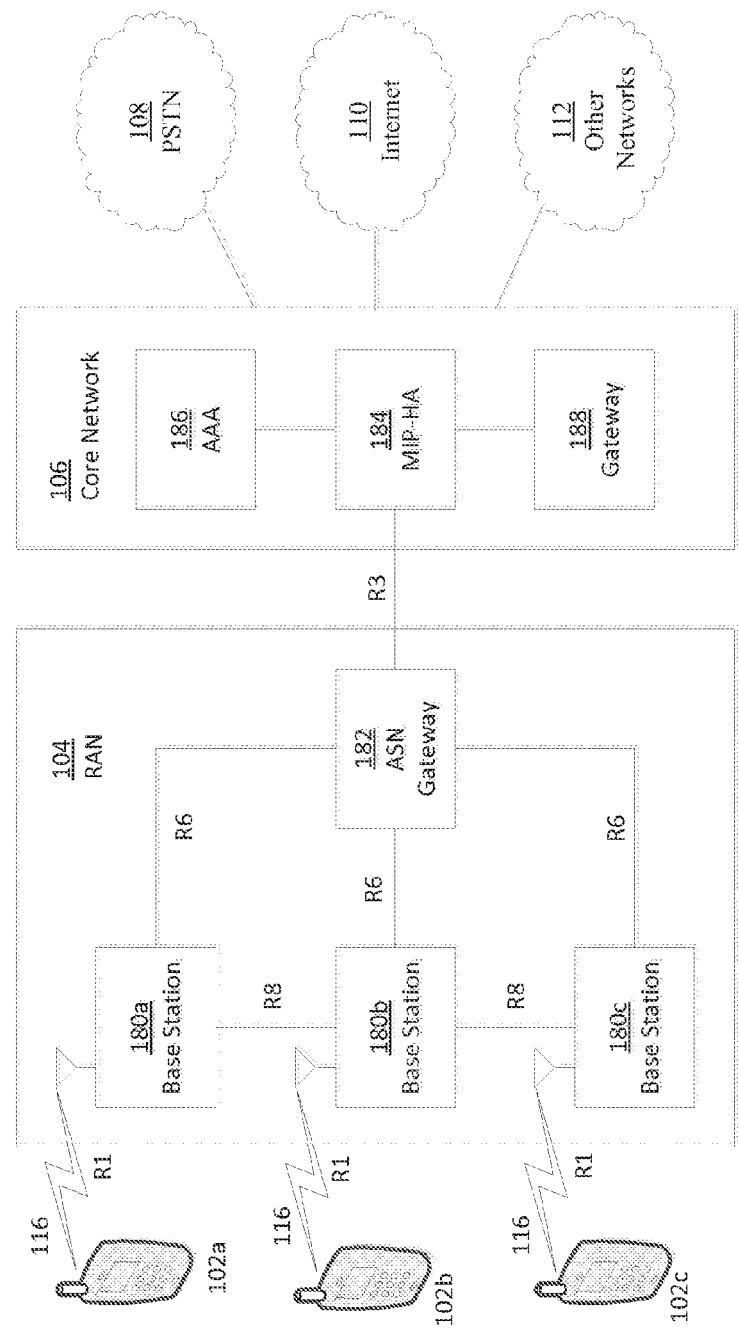
FIG. 1E is a system diagram of an example radio access network and an example core network that may be used within the communications system illustrated in FIG. 1A.

FIG. 1E is a system diagram of the RAN 104 and the core network 106 according to an embodiment. The RAN 104 may be an access service network (ASN) that employs IEEE 802.16 radio technology to communicate with the WTRUs 102a, 102b, 102c over the air interface 116. As will be further discussed below, the communication links between the different functional entities of the WTRUs 102a, 102b, 102c, the RAN 104, and the core network 106 may be defined as reference points.

As shown in FIG. 1E, the RAN 104 may include base stations 180a, 180b, 180c, and an ASN gateway 142, though it will be appreciated that the RAN 104 may include any number of base stations and ASN gateways while remaining consistent with an embodiment. The base stations 180a, 180b, 180c may each be associated with a particular cell (not shown) in the RAN 104 and may each include one or more transceivers for communicating with the WTRUs 102a, 102b, 102c over the air interface 116. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 106, and the like.

The air interface 116 between the WTRUs 102a, 102b, 102c and the RAN 104 may be defined as an R1 reference point that implements the IEEE 802.16 specification. In addition, each of the WTRUs 102a, 102b, 102c may establish a logical interface (not shown) with the core network 106. The logical interface between the WTRUs 102a, 102b, 102c and the core network 106 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 215 may be defined as an R6 reference point. The R6 reference point may include protocols for facilitating mobility management based on mobility events associated with each of the WTRUs 102a, 102b, 100c.

As shown in FIG. 1E, the RAN 104 may be connected to the core network 106. The communication link between the RAN 104 and the core network 106 may defined as an R3 reference point that includes protocols for facilitating data transfer and mobility management capabilities, for example. The core network 106 may include a mobile IP home agent (MIP-HA) 184, an authentication, authorization, accounting (AAA) server 186, and a gateway 188. While each of the foregoing elements are depicted as part of the core network 106, it will be appreciated that any one of these elements may be owned and/or operated by an entity other than the core network operator.

The presently disclosed subject matter relates to wireless communication systems and related methods. Particularly, the presently disclosed subject matter relates to techniques for physical layer network coding employing forward error correction (FEC) coding.

Physical-layer network coding may be used for exchanging information between two network nodes or wireless nodes. For example, physical layer network coding may be used in a two-way relaying scheme where two network nodes exchange information through a relay. For example, in a cellular system, a mobile station (MS) or user equipment (UE) may be located inside a coverage hole such as an underground tunnel or a building with thick walls. The MS and the UE may not able to communicate with the base station. A relay may be placed at the edge of the coverage hole, such as the entrance to the tunnel or the exterior wall of the building, with the backhaul antenna outside the tunnel entrance or building wall and the relay-access antenna inside the tunnel or building wall, thereby enabling communication of the UE with the base station. Similarly, a MS or UE may be located near the edge of a coverage hole, and may act as a relay to enable communication between a base station and a UE located inside a coverage hole. In an ad hoc communication system, such as a battlefield where two crews may be too far from each other to communicate, a third crew located between these two distant crews may act as a two-way relay for enabling the first two crews to exchange data.

Figure 2A:
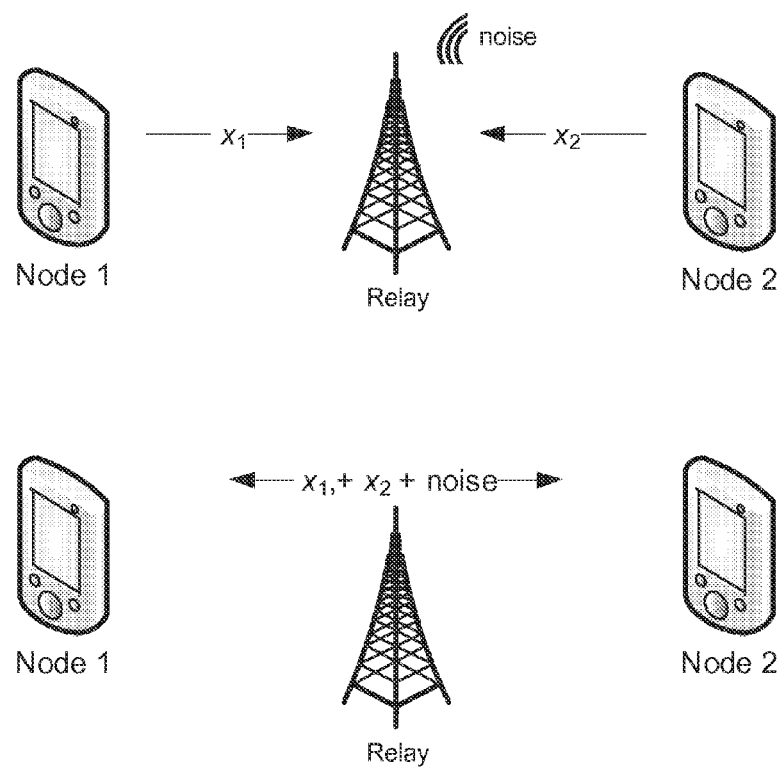
FIG. 2A is a diagram of an example system employing the amplify-and-forward approach to relaying.

FIG. 2A is a diagram of an example system employing the amplify-and-forward approach to relaying. As shown, node 1 may send signal x1 to the relay, and node 2 may send signal x2 to the relay. The relay may broadcast the signal it receives, such as the summation of the signals from node 1 and node 2, or $x_1+x_2$, together with the noise observed by the relay. Node 1 may decode the data from node 2, or x2, by performing echo cancellation and channel decoding. Likewise, node 2 may decode the data from node 1, or x1, by performing echo cancellation and channel decoding.

Figures 2B, 2C:
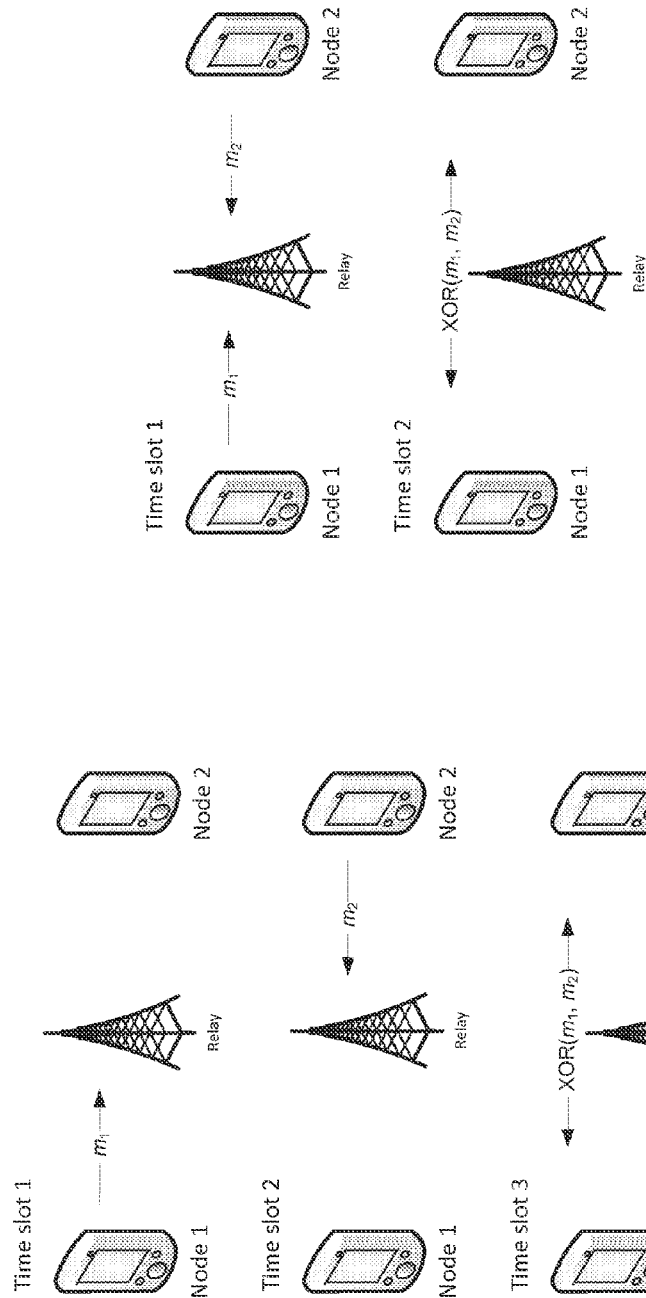
FIGS. 2B and 2C are diagrams of two variations of network coding as applied to two-way relays.

In an embodiment, network coding may be employed to enhance performance. The relay may perform some level of decoding of the messages from the two nodes and may forward the exclusive-OR of the messages back to the two nodes. FIGS. 2B and 2C are diagrams of two variations of network coding as applied to two-way relays. As shown in FIG. 2B, the nodes may send messages to the relay in different time slots. For example, node 1 may send message m1 to the relay in a first time slot such as time slot 1. Node 2 may send message m2 to the relay in a second time slot such as time slot 2. In a third time slot, the relay may broadcast a message decoding, for example, using an exclusive OR function (XOR) to node 1 and node 2. As the relay may not simultaneously receive messages from the nodes, overall spectral efficiency or throughput of the system may be limited.

As shown in FIG. 2C, the relay may receive messages from two nodes simultaneously. For example, node 1 may send message m1 to the relay in a first time slot such as time slot 1, and node 2 may send message m2 to the relay in the same time slot. The two messages, m1 and m2, may be superimposed on each other. In a second time slot, such as time slot 2, the relay may broadcast a message decoding, for example, using an exclusive OR function (XOR) to node 1 and node 2. In an embodiment, maximum-likelihood decoding and higher SNR may be implemented.

In an embodiment, network coding and channel coding may be combined at the physical layer. FIG. 3A is a diagram of an example system employing network coding scheme over a two-way relay. Referring to FIG. 3A, two network nodes such as WTRU 302A and WTRU 302B may exchange information through a relay. For example, the WTRU 302A may wish to transmit message $m_1$ to the WTRU 302B, and the WTRU 302B may wish to transmit message $m_2$ to the WTRU 302A.

For example, in a first time slot, the WTRU 302A may encode and modulate message $m_1$ intended for the WTRU 302B and may generate a signal $x_1$ carrying the message $m_1$. The WTRU 302A may transmit the signal $x_1$ to a relay such as relay 310. Likewise, the WTRU 302B may generate a signal $x_2$ by encoding and modulating message $m_2$ intended for the WTRU 302A. The WTRU 302B may transmit the modulated signal $x_2$ to the relay 310. In an embodiment, the signals from the WTRUs 302A and 302B may be transmitted to the relay 310 at the same time in the Medium Access Control (MAC)

phase. For example, the signals $x_1$ and $x_2$ may be transmitted to the relay 310 in the same time slot.

The relay may receive the summation of signals from the two wireless nodes, decode an encoding function of the information bits from the two nodes, and may broadcast the encoding function of the information bits back to the two wireless nodes. The wireless nodes may each derive the message from the other node from the received broadcast. The encoding function may be chosen such that the two nodes may exchange information without the relay completely decoding the bit streams from the two nodes. In an embodiment, the transmitters of the wireless nodes and the relays may employ FEC coding in combination with a modulation constellation for the signal-to-noise ratio (SNR) of the channel.

For example, the relay 310 may receive the superposition of the two signals, $x_1+x_2$. The relay 310 may decode the superposition of the two signals, $x_1+x_2$. For example, the summation of signals $x_1$ and $x_2$ as well as noise and/or other interference received along with the signals may be decoded to remove noise and/or other interference. The relay 310 may generate a composite message in the form of a network coding function of $m_1$ and $m_2$, such as $r(m_1, m_2)$. The composite message may contain fewer bits than the messages m1 and m2 combined.

Referring to FIG. 3A, the relay 310 may encode and modulate the composite message $r(m_1, m_2)$ and may generate a composite signal $x_R$. The relay 310 may broadcast the signal $x_R$ to the WTRUs 302A and 302B. For example, the relay 310 may broadcast signal $x_R$ in a second time slot, or in a broadcast phase. The WTRU 302A may receive signal $x_R$ and may extract the composite message $r(m_1, m_2)$. The WTRU 302A may derive the message $m_2$ from the WTRU 302B from $r(m_1, m_2)$ and $m_1$ using a network decoding function such as $g(r(m_1, m_2), m_1)$. The message $m_1$ was sent from the WTRU 302A, so it is known to the WTRU 302A. The WTRU 302B may receive signal $x_R$ and may extract the composite message $r(m_1, m_2)$. The WTRU 302B may derive the message $m_1$ from the WTRU 302A from $r(m_1, m_2)$ and $m_2$ using a network decoding function such as $g(r(m_1, m_2), m_1)$. As the message $m_2$ was sent from the WTRU 302B, the message $m_2$ is known to the WTRU 302A.

The sufficiency of the network coding function $r(m_1, m_2)$ may include the ability for the WTRU 302A to extract the incoming message $m_2$ based on $r(m_1, m_2)$ and the outgoing message $m_1$, and/or the ability for the WTRU 302B to extract the incoming message $m_1$ based on $r(m_1, m_2)$ and the outgoing message $m_2$. The network decoding function g( ) may be defined such that $m_1=g(r(m_1, m_2), m_2)$ and $m_2=g(r(m_1, m_2), m_1)$. The channel coding schemes for $m_1$, $m_2$, and $r(m_1, m_2)$ may be selected based on channel condition. For example, the channel coding schemes may be selected according to the rate achievable under a given SNR for each individual wireless connection and whether physical-layer network coding may be constructed and implemented using such channel code.

While physical-layer network coding is described in connection with two-way relaying herein, it is understood that the physical-layer network coding may apply to other settings. For example, network coding may be used to improve the multicast throughput of a network, where some of the nodes in the network may receive multiple data streams. Physical-layer network coding may improve the spectral efficiency of a wireless network by allowing these nodes to receive two data streams using the same radio resources such as time and bandwidth.

FIG. 3B illustrates an example system employing network coding scheme over a helper WTRU. As shown, a helper WTRU 302C that may act as a relay between an eNodeB 320 and a WTRU 302E. For example, without the helper WTRU 302C, the eNodeB 320 and the WTRU 302E may not communicate with the eNodeB due to excessive path loss or otherwise inadequate coverage. The eNodeB 320 may send message $m_1$ to a helper WTRU 302C. WTRU 302E may send message $m_2$ to the helper WTRU 302C. The helper WTRU 302C may receive messages $m_1$ and $m_2$, and may generate a composite message using a network coding function of $m_1$ and $m_2$ such as $r(m_1, m_2)$. The helper WTRU 302C may send a signal with the composite message to the eNodeB 320 and the WTRU 302E. The eNodeB 320 and the WTRU 302E may respectively extract the messages intended for them in accordance to the methods described herein with respect to the message exchange between two WTRUs.

In an embodiment, physical-layer network coding (PNC) can be performed over finite field or Galois field (GF) of 2 (GF(2)) and binary phase-shift keying (BPSK)/Quadrature phase-shift keying (QPSK). The order q of the GF(q) may be extended to larger prime numbers beyond 2, such as 3, 5, 7, 11, 13, 17, etc. There may be q points in a pulse amplitude modulation (PAM) when modulating the transmission. In the case of complex modulation, a square QAM may be constructed from two orthogonal q-PAMs consisting of $q^2$ points in a two-dimensional plane.

In an embodiment, FEC coding may be combined with network coding in the MAC phase. Multiple FEC coded transmissions may be received simultaneously. Direct decoding of $r(m_1, m_2)$ may takes place. The log likelihood ratios (LLRs) may be determined for the corresponding constellation.

Figure 5A:
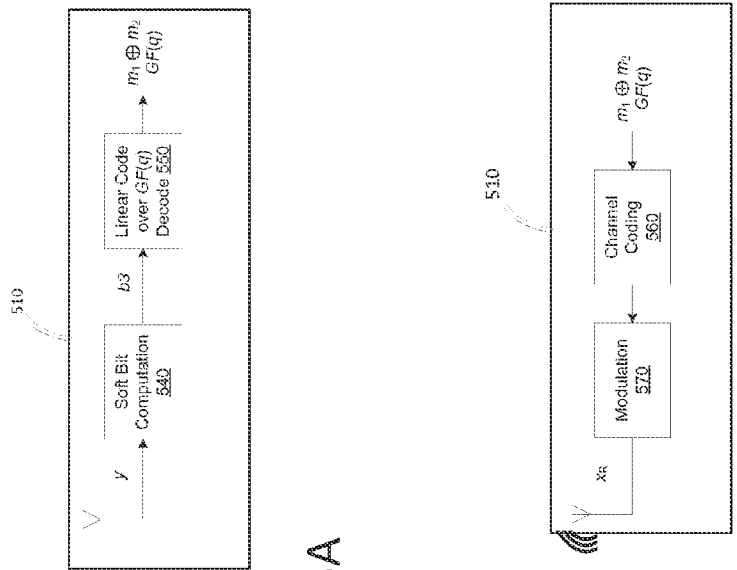
FIGS. 5A and 5B illustrate an example relaying scheme.
Figure 5B:
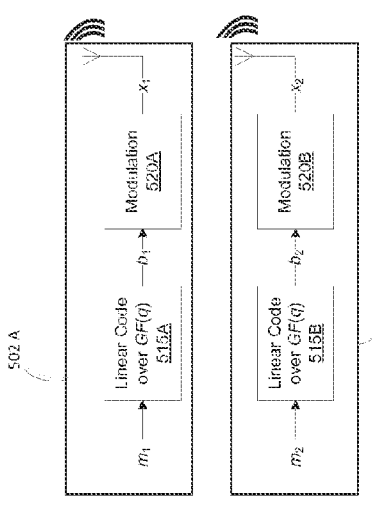

FIGS. 5A and 5B illustrate an example relaying scheme. As shown, WTRU 502A and WTRU 502B may exchange messages via relay 510.

FIG. 4A illustrates example procedure for relaying message exchanges between two network entities. The procedure may be implemented and/or performed by a relay such as relay 310 describe herein with respect to FIG. 3A, by relay 510 described herein with respect to FIGS. 5A and 5B, by a helper WTRU such as WTRU 302C described herein with respect to FIG. 3B, and/or by any other network node that may receive and send messages. In an embodiment, a relay may include a WTRU 102 described above with respect FIGS. 1A-1E.

As shown in FIG. 4A, at 410, a field order may be determined based on channel condition. The field order q may equal to a prime number such as 2, 3, 5, 7, 11, 13, etc. For example, a primary q may be selected based on the Signal to Noise Ratio (SNR) and/or Signal to Interference plus Noise Ratio (SINR). In an embodiment, there may be q points in a PAM when modulating the relay transmission. In the case of complex modulation, a square QAM may be constructed from two orthogonal q-PAMs including $q^2$ points. The value of field order q may be chosen such that q-PAM or $q^2$-QAM may be suited for the SINR of the wireless channel for achieving a predetermined spectral efficiency threshold. The q-PAM or $q^2$QAM modulation may be denoted as $M_q$. The determined field order may be signaled to the network entities/nodes that may exchange messages via the relay. For example, and referring back to FIG. 5A, the relay 510 may determine the value of field order q, and may signal the value of order q to the WTRUs 502A and 502B.

FIG. 4B illustrate example procedure for a network entity to exchange messages with another network entity via a relay. The procedure may be implemented and/or performed by a network node or a WTRU such as WTRU 102 described herein with respect to FIGS. 1A-1E, WTRU 302 described herein with respect to FIGS. 3A and 3B, by WTRU 502 described herein with respect to FIGS. 5A and 5B, by a helper WTRU such as WTRU 302C described herein with respect to FIG. 3B, and/or or by any other network node that may receive and send messages.

As shown in FIG. 4B, at 450, a field order q for encoding outgoing messages may be received. For example, the field order q may be received from a relay that may facilitate the message exchange. Referring to FIG. 5A, the WTRUs 502A and 502B may send the SNR/SINR that they may observe to the relay, to assist the relay in determining the field order. In an embodiment, the WTRUs 502A and 502B may propose the field order to the relay.

At 460, an outgoing message may be encoded with linear codes over a field of the field order. A field as used herein may include an algebraic structure with operators of addition, subtraction, multiplication, and division, satisfying certain properties, in particular, closure, associativity, commutativity, identities, inverses, and distributivity. An example of field may be Galois field (GF), which may be a field with finite number of elements. The order, or the number of elements, of Galois fields takes the form $q^n$, denoted as $GF(q^n)$, where q may be a prime number, and n may be a positive integer. An example of Galois field may be GF(2), including binary numbers 0 and 1. Addition over GF(2) may be exclusive-OR, and multiplication GF(2) may be logical-AND. When n=1, $GF(q^n)$ may become GF(q), and the addition over GF(q) may be defined as real addition modulo-q. Addition over $GF(q^n)$ may be defined as digit-wise modulo-q, not modulo-$q^n$.

Referring back to FIG. 5A, outgoing message $m_1$ may be encoded to form encoded message b1 such that b1 may express message m1 in GF(q). At 515A, linear FEC codes $C_q$ may be constructed over Galois field of order q, denoted as GF(q) such that the message $m_1$ may be expressed in GF(q). For example, the messages $m_1$ may be represented using integers $\{0, 1, 2, \ldots, q-1\}$. The message $m_1$ may be encoded with the linear FEC code $C_q$ to generate $b_1 = C_q(m_1)$. Similarly, at 515B, outgoing message $m_2$ from the WTRU 502B may be encoded into an encoded message b2 using linear code over GF(q), e.g., $b_2 = C_q(m_2)$.

Referring back to FIG. 4B, at 460, the encoded message may be transmitted. As shown in FIG. 5A, the encoded messages b1 and b2 may be modulated at 520A and 520B respectively. For example, the encoded message b1 may be transmitted using q-PAM modulation, or $q^2$QAM. By combining two qPAM symbols into one, the modulation can be extended to $q^2$QAM (or QPSK when q=2).

The transmitter of the WTRU 502A may transmit signal x1 carrying the modulated encoded message to the relay 510. The signal $x_1$ may be denoted as $x_1 = M_q(C_q(m_1))$. Likewise, the transmitter of the WTRU 502B may signal $x_2$ carrying the modulated encoded message to the relay 510, where $x_2 = M_q(C_q(m_2))$. In an embodiment, the signals $x_1$ and $x_2$ may be transmitted simultaneously, such as in the same time slot.

Referring back to FIG. 4A, at 420, a signal carrying a first message superimposed with a second message may be received. For example, and as shown in FIG. 5A, the relay 510 may receive signal y via a receiver. The received signal y may carry superimposed signals $x_1+x_2$, which may be mixed with noise and/or interference denoted as n. For example, the received signal y may be expressed as $y = x_1 + x_2 + n$.

At 430, the received signal may be decoded to generate a composite message with linear codes over field of the field order. For example, and as shown in FIG. 5A, at 540 soft bit(s) for the received signal y may be computed, and network coded composite message b3 may be generated.

In an embodiment, the soft bit LLRs for BPSK, 3PAM, and the summation of their pairs may be approximated with the following formulae, given a received signal y and noise variance $\sigma^2$:

| LLR Formula | BPSK | BPSK + BPSK | 3PAM | 3PAM + 3PAM |
|---|---|---|---|---|
| LLR(0) | $-\dfrac{2y}{\sigma^2}$ | $-\ln(2) + \dfrac{2|y|-2}{\sigma^2}$ | $-\dfrac{2y+1}{2\sigma^2}$ | $\dfrac{1 - 2\left\|y + \dfrac{1}{2}\right\| - \dfrac{3}{2}}{2\sigma^2}$ |
| LLR(1) | $\dfrac{2y}{\sigma^2}$ | $-\ln(2) + \dfrac{2-2|y|}{\sigma^2}$ | $\dfrac{-2|y|+1}{2\sigma^2}$ | $\dfrac{1 - 2\left\|y - \dfrac{1}{2}\right\| - \dfrac{3}{2}}{2\sigma^2}$ |
| LLR(2) | — | — | $\dfrac{2y-1}{2\sigma^2}$ | $\ln\dfrac{3}{2} + \dfrac{1 - 2|y|}{2\sigma^2}$ |

For example, for simple BPSK constellation, given a received signal y and noise variance $\sigma^2$, the soft bit LLR may be derived as follows:

$$LLR(1) = \ln\frac{Pr(1 \mid y)}{Pr(0 \mid y)} = \ln\frac{Pr(1, y)/Pr(y)}{Pr(0, y)/Pr(y)} =$$

$$\ln\frac{Pr(y \mid 1)Pr(1)}{Pr(y \mid 0)Pr(0)} = \ln\frac{Pr(y \mid 1)}{Pr(y \mid 0)} = \ln\frac{\dfrac{1}{\sqrt{2\pi\sigma^2}}e^{-\dfrac{(y-1)^2}{2\sigma^2}}}{\dfrac{1}{\sqrt{2\pi\sigma^2}}e^{-\dfrac{(y+1)^2}{2\sigma^2}}} = \frac{2y}{\sigma^2},$$

and/or $$LLR(0) = \ln\frac{Pr(0 \mid y)}{Pr(1 \mid y)} = -LLR(1) = -\frac{2y}{\sigma^2}.$$

In an embodiment, Viterbi decoding function vitdec( ) may be used for the computation. The input value may include Pr(1|y) scaled by $2^N-1$. For example, the input value may be 0 for most confident 0, and $2^N-1$ for most confident 1. Given $$LLR(1) = \ln\frac{Pr(1\mid y)}{Pr(0\mid y)} = \ln\frac{Pr(1\mid y)}{1-Pr(1\mid y)},$$

it may be deduced that $$e^{LLR(1)} = \frac{Pr(1\mid y)}{1-Pr(1\mid y)},$$

and $$Pr(1\mid y) = \frac{e^{LLR(1)}}{1+e^{LLR(1)}} = 1 - \frac{1}{1+e^{LLR(1)}}.$$

Similarly, the soft bit LLRs can be derived for any Galois field GF(q). For example, for 3PAM modulation shown in FIG. 7(a), the soft bit LLR may be expressed as $$LLR(0) = \ln\frac{Pr(0\mid y)}{Pr(1,2\mid y)}.$$

Given that $$Pr(0\mid y) = \frac{Pr(y\mid 0)Pr(0)}{Pr(y)} = \frac{1}{3Pr(y)}Pr(y\mid 0),$$

and $$Pr(1,2\mid y) = Pr(1\mid y) + Pr(2\mid y) = \frac{1}{3Pr(y)}(Pr(y\mid 1) + Pr(y\mid 2)),$$

it may be deduced that $$LLR(0) = \ln\frac{\frac{1}{\sqrt{2\pi\sigma^2}}e^{-\frac{(y+1)^2}{2\sigma^2}}}{\frac{1}{\sqrt{2\pi\sigma^2}}\left(e^{\frac{y^2}{2\sigma^2}} + e^{-\frac{(y-1)^2}{2\sigma^2}}\right)} =$$

$$\ln\frac{e^{-\frac{(y+1)^2}{2\sigma^2}}}{e^{-\frac{y^2}{2\sigma^2}}\left(1+e^{-\frac{2y-1}{2\sigma^2}}\right)} = \frac{-(2y+1)}{2\sigma^2} - \ln\left(1+e^{-\frac{2y-1}{2\sigma^2}}\right).$$

The soft bit may be computed using the first-order approximation, such as $$LLR(0) \approx -\frac{2y+1}{2\sigma^2}.$$

In an embodiment, an auxiliary function such as $f(x)=\ln(1+e^x)$, may be used for computing the soft bit. For example, the function may be implemented such that $$f(x) \approx \begin{cases} x, & x \gg 1 \\ 0, & x \ll 0 \end{cases},$$

and $$f(-x) = f(x) - x.$$

The soft bit LLR(0) may be computed as $$LLR(0) = -\frac{2y+1}{2\sigma^2} - f\left(\frac{2y-1}{2\sigma^2}\right),$$

or may be approximated as $$LLR(0) \approx \frac{-2y-1}{2\sigma^2}.$$

Similarly, the soft bit may be expressed as $$LLR(1) = \ln\frac{e^{-\frac{y^2}{2\sigma^2}}}{e^{-\frac{(y+1)^2}{2\sigma^2}} + e^{-\frac{(y-1)^2}{2\sigma^2}}} = -\ln\left(e^{-\frac{2y+1}{2\sigma^2}} + e^{-\frac{-2y+1}{2\sigma^2}}\right).$$

When the received signal y≥0, the soft bit may be expressed as $$LLR(1) = -\ln\left(e^{-\frac{-2y+1}{2\sigma^2}}\left(1+e^{-\frac{4y}{2\sigma^2}}\right)\right) = \frac{-2y+1}{2\sigma^2} - f\left(\frac{-4y}{2\sigma^2}\right).$$

When the received signal y≤0, $$LLR(1) = -\ln\left(e^{-\frac{2y+1}{2\sigma^2}}\left(1+e^{\frac{-4y}{2\sigma^2}}\right)\right) = \frac{2y+1}{2\sigma^2} - f\left(\frac{4y}{2\sigma^2}\right).$$

It may be deduced from the above that the soft bit LLR(1) may be computed as $$LLR(1) = \frac{-2|y|+1}{2\sigma^2} - f\left(\frac{-4|y|}{2\sigma^2}\right),$$

or may be approximated as $$LLR(1) \approx \frac{-2|y|+1}{2\sigma^2}.$$

Following the same approach, the soft bit LLR(2) may be approximated as $$LLR(2) \approx \frac{2y-1}{2\sigma^2}.$$

The soft bit(s) for the summation of two BPSK constellations shown in FIG. 6(b) may be computed. As shown in FIG. 6(b), the constellation is symmetric about the origin y=0. As such the soft bits may be computed based on x=|y|, and may apply folded normal distribution. For example, the soft bit(s) may be express as follows:

$$LLR(m=1) = \ln\frac{Pr(m=1|x)}{Pr(m=0|y)}$$
$$= \ln\frac{Pr(1|x)}{Pr(0|y)}$$
$$= \ln\frac{Pr(1,x)/Pr(x)}{Pr(0,x)/Pr(x)}$$
$$= \ln\frac{Pr(x|1)Pr(1)}{Pr(x|0)Pr(0)}$$
$$= \ln\frac{Pr(x|1)}{Pr(x|0)}$$
$$= \ln\frac{\frac{1}{\sqrt{2\pi\sigma^2}}\left(e^{-\frac{(-x)^2}{2\sigma^2}} + e^{-\frac{x^2}{2\sigma^2}}\right)}{\frac{1}{\sqrt{2\pi\sigma^2}}\left(e^{-\frac{(-x-2)^2}{2\sigma^2}} + e^{-\frac{(x-2)^2}{2\sigma^2}}\right)}$$
$$= \ln\frac{2e^{-\frac{x^2}{2\sigma^2}}}{e^{-\frac{(x+2)^2}{2\sigma^2}} + e^{-\frac{(x-2)^2}{2\sigma^2}}}$$
$$= \ln(2) + \frac{2-2x}{\sigma^2} - \ln\left(1 + e^{\frac{-4x}{2\sigma^2}}\right)$$
$$= \ln(2) + \frac{2-2|y|}{\sigma^2} - f\left(\frac{-4|y|}{2\sigma^2}\right)$$

$$LLR(m=1) \approx \ln(2) + \frac{2-2|y|}{\sigma^2}.$$

As $$LLR(m=0) = -LLR(m=1) = -\ln(2) + \frac{2|y|-2}{\sigma^2} + f\left(\frac{-4|y|}{2\sigma^2}\right),$$

the soft bit LLR(m=0) may be computed as $$LLR(m=0) \approx -\ln(2) + \frac{2|y|-2}{\sigma^2}.$$

The soft bit(s) for the summation of two 3PAM constellations shown in FIG. 7(b) may be computed. For example, the soft bit(s) may be express as follows:

$$LLR(m=0) = \ln\frac{Pr(m=0|y)}{Pr(m\neq 0|y)} = \ln\frac{Pr(y|0)Pr(0)}{Pr(y|1)Pr(1) + Pr(y|2)Pr(2)},$$
$$LLR(m=1) = \ln\frac{Pr(m=1|y)}{Pr(m\neq 1|y)} = \ln\frac{Pr(y|1)Pr(1)}{Pr(y|0)Pr(0) + Pr(y|2)Pr(2)},$$
$$LLR(m=2) = \ln\frac{Pr(m=2|y)}{Pr(m\neq 2|y)} = \ln\frac{Pr(y|2)Pr(2)}{Pr(y|0)Pr(0) + Pr(y|1)Pr(1)}.$$

For example, soft bit LLR(m=2) may be expressed as $$LLR(m=2) = \ln\frac{\frac{3}{9}e^{-\frac{y^2}{2\sigma^2}}}{\frac{1}{9}e^{-\frac{(y+2)^2}{2\sigma^2}} + \frac{2}{9}e^{-\frac{(y-1)^2}{2\sigma^2}} + \frac{2}{9}e^{-\frac{(y+1)^2}{2\sigma^2}} + \frac{1}{9}e^{-\frac{(y-2)^2}{2\sigma^2}}}$$
$$= -\ln\left(\frac{1}{3}e^{-\frac{-(4y+4)}{2\sigma^2}} + \frac{2}{3}e^{\frac{-(2y+1)}{2\sigma^2}} + \frac{2}{3}e^{\frac{2y-1}{2\sigma^2}} + \frac{1}{3}e^{\frac{4y-4}{2\sigma^2}}\right).$$

Considering y≥0 and y≤0, soft bit LLR(m=2) may be expressed as $$LLR(m=2) = -\ln\left(\frac{2}{3}e^{\frac{2|y|-1}{2\sigma^2}}\left(1 + e^{\frac{-2|y|}{\sigma^2}}\right) + \frac{1}{3}e^{\frac{2|y|-2}{\sigma^2}}\left(1 + e^{\frac{-4|y|}{\sigma^2}}\right)\right).$$

Since $$2e^{\frac{2|y|-1}{2\sigma^2}} \gg e^{\frac{2|y|-2}{\sigma^2}}$$

for 0≤|y|≤1, the second term may be ignored. As such, soft bit LLR(m=2) may be approximated as $$LLR(m=2) \approx \ln\frac{3}{2} + \frac{1-2|y|}{2\sigma^2} - f\left(\frac{-2|y|}{\sigma^2}\right),$$

and/or $$LLR(m=2) \approx \ln\frac{3}{2} + \frac{1-2|y|}{2\sigma^2}.$$

Soft bit LLR(m=0) may be approximated as $$LLR(m=0) \approx \frac{1 - 2\left\|y + \frac{1}{2}\right\| - \frac{3}{2}|}{2\sigma^2},$$

and soft bit LLR(m=1) may be approximated as $$LLR(m=1) \approx \frac{1 - 2\left\|y - \frac{1}{2}\right\| - \frac{3}{2}|}{2\sigma^2}.$$

The soft bit LLR may be computed following the approach described above for any size constellation and for the summation of signals having gone through arbitrary but known channel h.

As shown in FIG. 5A, upon computing the soft bits, network coded composite message b3 may decoded at 550. As the messages m1 and m2 are superimposed, a composite message may be decoded. For example, a composite message in the form of a network coding function of $m_1$ and $m_2$, such as $r(m_1, m_2)$, may be generated. In an embodiment, the composite message may be generated over GF(q), where q may be a prime number. For example, linear channel codes defined on finite fields GF(2), GF(3), GF(5), GF(7), GF(11), GF(13), GF(17), GF(19), etc., may be chosen.

The function $r(m_1, m_2)$ may include $m_1 \oplus m_2$, with $\oplus$ denoting summation/addition operation over GF(q). The summation or addition over GF(q) may include modulo-q real addition of the possible messages, namely $r(m_1, m_2) = m_1 \oplus m_2 = m_1 + m_2 \bmod q$. Since $m_1$ and $m_2$ may belong to GF(q), $r(m_1, m_2)$ may belong to GF(q).

Noise and/or other interference may be removed from the network coded composite message b3 during decoding. For example, the relay 510 may decode the network coded message b3 in view of the linearity of the FEC code over GF(q). For example, $C_q(m_1) \oplus C_q(m_1)$ may equal to $C_q(m_1 \oplus m_2)$.

When noise is absent, the relay may receive $y=x_1+x_2=M_q(C_q(m_1))+M_q(C_q(m_2))$. When present, the noise and/or other interference may be removed by computing $\hat{y}=x_1+x_2 \bmod(q)=M_q(C_q(m_1))\oplus M_q(C_q(m_2))=M_q(C_q(m_1)\oplus C_q(m_2))=M_q(C_q(m_1\oplus m_2))$.

The relay 510 may decode the composite message $m_1\oplus m_2$. The composite message may include the same amount of information as an outgoing message from one sender WTRU. For example, the composite message may include the same amount of information as message $m_1$ or message $m_2$. As such, the relay 510 may not need to decipher $m_1$ or $m_2$ individually.

Turning back to FIG. 4A, at 440, a signal carrying the composite message may be transmitted. For example, the composite message $r(m_1, m_2)$ may be broadcasted using a capacity-achieving modulation and channel coding, such as GF(q) linear FEC code. For example, the composite message may be broadcasted using any other capacity-achieving modulation and channel coding.

FIG. 5B illustrates example relaying in the broadcast phase. As shown, at 560, the composite message $m_1\oplus m_2$ may be channel coded using a capacity-achieving channel code. At 570, the composite message may be modulated using a capacity-achieving modulation method. A composite signal $x_R$ with the composite message may be transmitted via transmitter of the relay 510.

Referring to FIG. 4B, at 480, a signal carrying a composite message may be received. For example, as shown in FIG. 5B, the composite signal $x_R$ from the relay 510 may be received by the WTRUs 502A and 502B. At 580A, the signal $x_R$ may be demodulated. At 590A, the output of demodulation may be channel decoded, and the composite message $m_1\oplus m_2$ may be extracted. Similarly, the WTRU 502B may extract demodulate the signal $x_R$ at 580B, and may perform channel decoding at 590B.

Referring to FIG. 4B, at 490, an incoming message may be extracted from the composite message using linear subtraction over field of the field order. In an embodiment, the network decoding function g( ) may include linear subtraction over GF(q). For example, subtraction over GF(q) may be denoted as $\ominus$. The sufficiency of the network encoding function r( ) may be expressed as the existence of decoding function g( ) such that $g(r(m_1, m_2), m_2)=m_1\oplus m_2\ominus m_2=m_1$. The network decoding function g( ) may be used by the receiving WTRUs to derive the message from the sending WTRU from the network coded message.

For example and as shown in FIG. 5B, the incoming message m2 intended for the WTRU 502A may be extracted from the composite message $m_1\oplus m_2$ at 595A. For field order q, subtraction over GF(q) may include linear subtraction modulo-q. The WTRU 502A may derive $m_2$ based on composite message $m_1\oplus m_2$ or $r(m_1, m_2)$ and $m_1$ by applying $g(r(m_1, m_2), m_2)=m_1\oplus m_2\ominus m_1=m_2$. Similarly, the WTRU 502B may extract incoming message $m_1$ from $r(m_1, m_2)$ and $m_2$ at 595B.

The network encoded message may be modulated using q-PAM modulation. In an embodiment, q-PAM may be mapped and modulo-q addition may be performed in a BPSK system. For example, prime number 2 may be selected as q.

FIG. 6 shows an example BPSK constellation and superposition. Part (a) of FIG. 6 shows example BPSK constellation and part (b) shows example superposition values of two BPSK constellations, where e denotes addition over GF(2). For example, GF(2) may include addition modulo-2, or exclusive-OR. In BPSK, a bit $m_1=0$ may be mapped to $x_1=1$, and a bit $m_1=1$ may be mapped to $x_1=+1$. Assuming the channels have a unity gain, two BPSK signals may be summed together over the air, and superimposed signals $x_1+x_2$ may be received by the relay. As shown in part (b) of FIG. 6, there may be 4 possible combinations of bit values, which may result in 3 possible amplitudes of $x_1+x_2$: −2, 0, and +2.

In an embodiment, the relay may decode composite message $m_1\oplus m_2$, where $\oplus$ denotes addition over GF(2) such as modulo-2 addition. For example, $|x_1+x_2|>1$ may imply $m_1\oplus m_2$ may equal to 0, otherwise $m_1\oplus m_2$ may equal to 1.

In a system employing FEC over GF(2), both the input and output may be represented over GF(2) alphabet (0 and 1). The FEC may use a linear code such that if $b_1$ and $b_2$ are codewords, $b_1\oplus b_2$ may also be a codeword.

In an embodiment, q-PAM may be mapped and modulo-q addition may be performed in a QPSK system. QPSK may include two independent dimensions of BPSK. Systems and relays transmitting QPSK employing linear FEC over GF(2) may work the same way as described above with respect to the BPSK system.

In an embodiment, prime number 2 may be selected as q when the SNR is relatively low. Larger constellations may be needed over channels with better SNR. For example GF(3), or number 3 may be selected as the value for field order q.

Table 1A and table 1B example the definition of addition and multiplication over GF(3). As shown, the addition and multiplication over GF(3) satisfy the definition of a finite field, and the operators may be implemented using real addition and multiplication modulo-3.

TABLE 1A

| $\oplus$ | 0 | 1 | 2 |
|---|---|---|---|
| 0 | 0 | 1 | 2 |
| 1 | 1 | 2 | 0 |
| 2 | 2 | 0 | 1 |

TABLE 1B

| * | 0 | 1 | 2 |
|---|---|---|---|
| 0 | 0 | 0 | 0 |
| 1 | 0 | 1 | 2 |
| 2 | 0 | 2 | 1 |

Table 2A and table 2B show example definition of addition and multiplication over GF(5). As shown, the addition and multiplication over GF(5) satisfy the definition of a finite field. Each row and column in the addition table may include a permutation of the elements in GF(5) such that the inverse of addition, $\ominus$, may be found.

TABLE 2A

| $\oplus$ | 0 | 1 | 2 | 3 | 4 |
|---|---|---|---|---|---|
| 0 | 0 | 1 | 2 | 3 | 4 |
| 1 | 1 | 2 | 3 | 4 | 0 |
| 2 | 2 | 3 | 4 | 0 | 1 |
| 3 | 3 | 4 | 0 | 1 | 2 |
| 4 | 4 | 0 | 1 | 2 | 3 |

TABLE 2B

| * | 0 | 1 | 2 | 3 | 4 |
|---|---|---|---|---|---|
| 0 | 0 | 0 | 0 | 0 | 0 |
| 1 | 0 | 1 | 2 | 3 | 4 |
| 2 | 0 | 2 | 4 | 1 | 3 |
| 3 | 0 | 3 | 1 | 4 | 2 |
| 4 | 0 | 4 | 3 | 2 | 1 |

The above-described superposition scheme may be extended to larger constellations q-PAM, where q may be a prime number. For example, q may equal to 2, 3, 5, 7, 11, 13, etc. The FEC used for encoding may be linear over GF(q).

FIG. 7 illustrates example constellation and superposition of two 3PAMs. As shown in part (a) of FIG. 7, a ternary one-dimensional constellation may be used when GF(3) is selected. In FIG. 7, ⊕ denotes addition over GF(3), namely addition modulo-3. As shown in part (b) of FIG. 7, a composite message $m_1 \oplus m_2$ may be unambiguously generated using a linear FEC code over GF(3).

In an embodiment, a two-dimensional constellation such as QAM may be used. For example, in QAM, data may be coded into in-phase (I) and quadrature (Q). A $q^2$QAM may be considered as two orthogonal q-PAMs.

Figure 8:
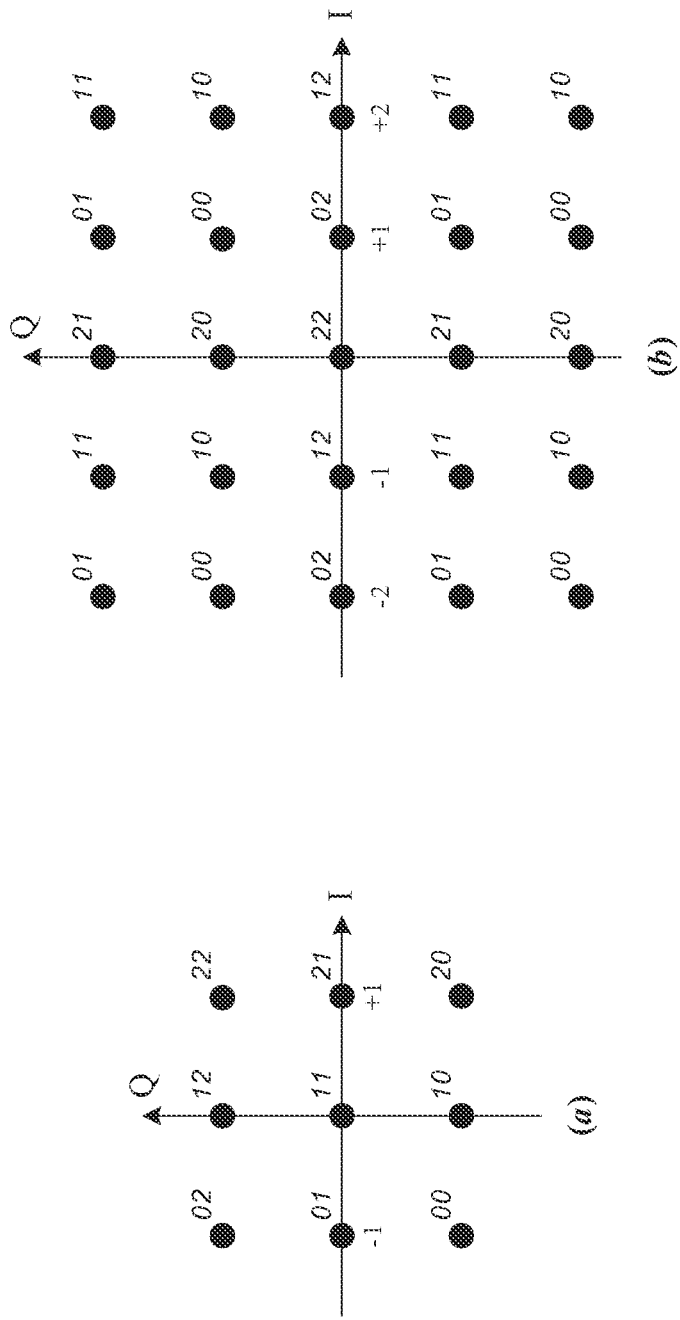
FIG. 8 illustrates example constellation and superposition of two 9PAMs.

FIG. 8 illustrates example constellation and superposition of two 9PAMs. As shown in part (a) of FIG. 8, two ternary digits may be encoded using 9PAM constellation. FIG. 8 part (b) illustrates example summation of two 9QAMs. The I and Q phases may be treated separately. As shown in FIG. 8, a composite message $m_1 \oplus m_2$ may be unambiguously generated using a linear FEC code over GF(3). Other constellation and superposition for QAM such as SPAM/25QAM, 7PAM/49QAM, 11PAM/121 QAM, etc. may be constructed in the same manner as described above with respect to 3PAM/9QAM.

In an embodiment, message data may be represented in binary digits. Binary data may be converted to a representation using an arbitrary base, or modulus-q, via a modulus converter. To illustrate, binary data, or modulus-2, may be converted to decimal representations of any integer, modulus-10. A stream of binary data may be considered as a large integer represented in binary.

Figure 9:
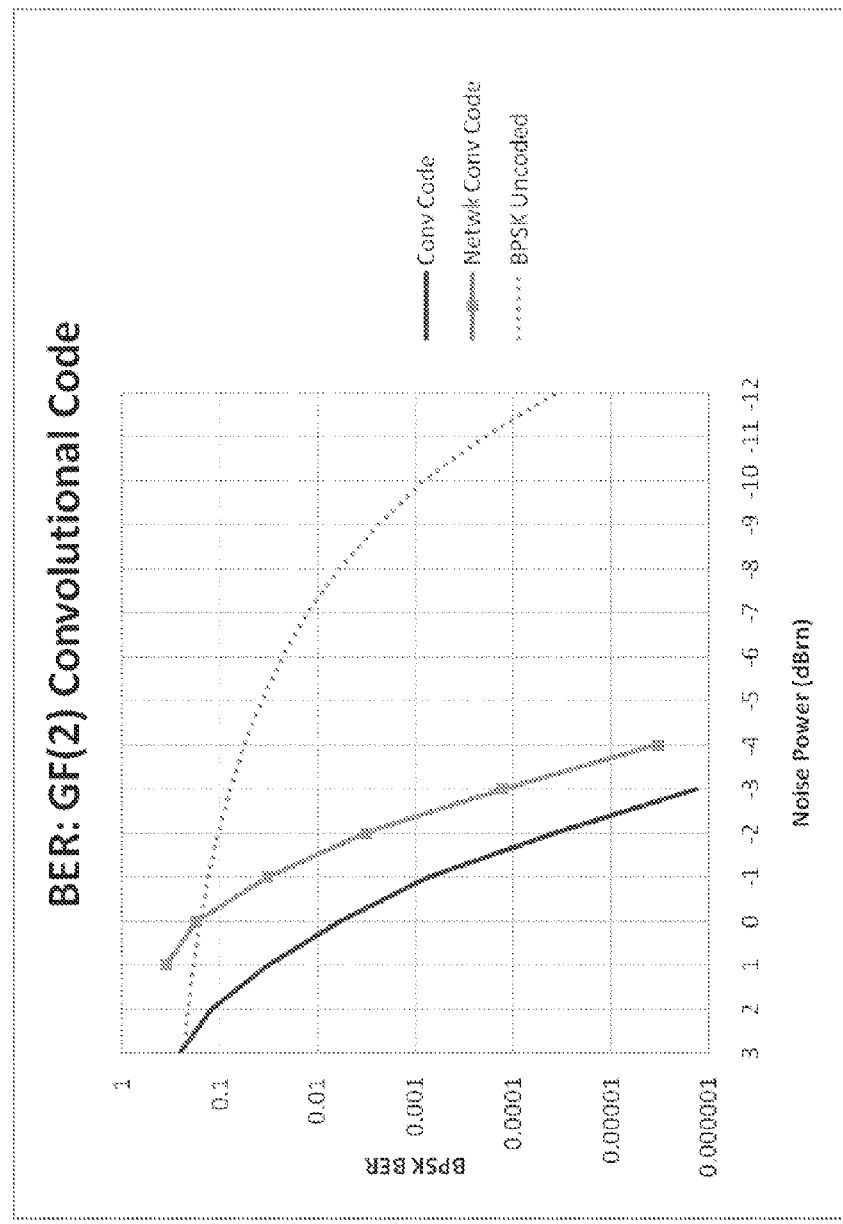
FIG. 9 shows an example bit error comparison of different coding schemes.

FIG. 9 shows an example bit error comparison of different coding schemes. Specifically, FIG. 9 shows an example bit error rate comparison among a rate-1/3 constraint length-7 trellis code such as polynomials 133, 171, and 165, single link, two-way network coding using the same GF(2) trellis code, and uncoded BPSK over a single link.

For the purpose of illustration, it may be assumed that the transmitters transmit at power=1 ($M_2=\{-1, +1\}$). In the PNC case, two signals may arrive at the relay simultaneously. The channels have a unity gain that may equal to 1. The noise power may be as indicated in the abscissa with reference level 0 dBrn=1. Bit errors may be measured in PNC receiver. Soft decoding may be used in the Viterbi decoder.

As shown, compared to the convolutional code, PNC over BPSK may lose about 1 to 2 dB, depending on the SNR. The loss may be attributed to the 3-point constellation in FIG. 6 (b), which may be less reliable than the 2-point BPSK constellation in FIG. 6 (a). The power of PNC—the performance of decoding $m_1 \oplus m_2$ from the superposition of two transmissions may be substantially the same as decoding a single transmission. The slight loss in performance may be due to the expansion of the constellation, which may diminish for large constellations.

Figure 10:
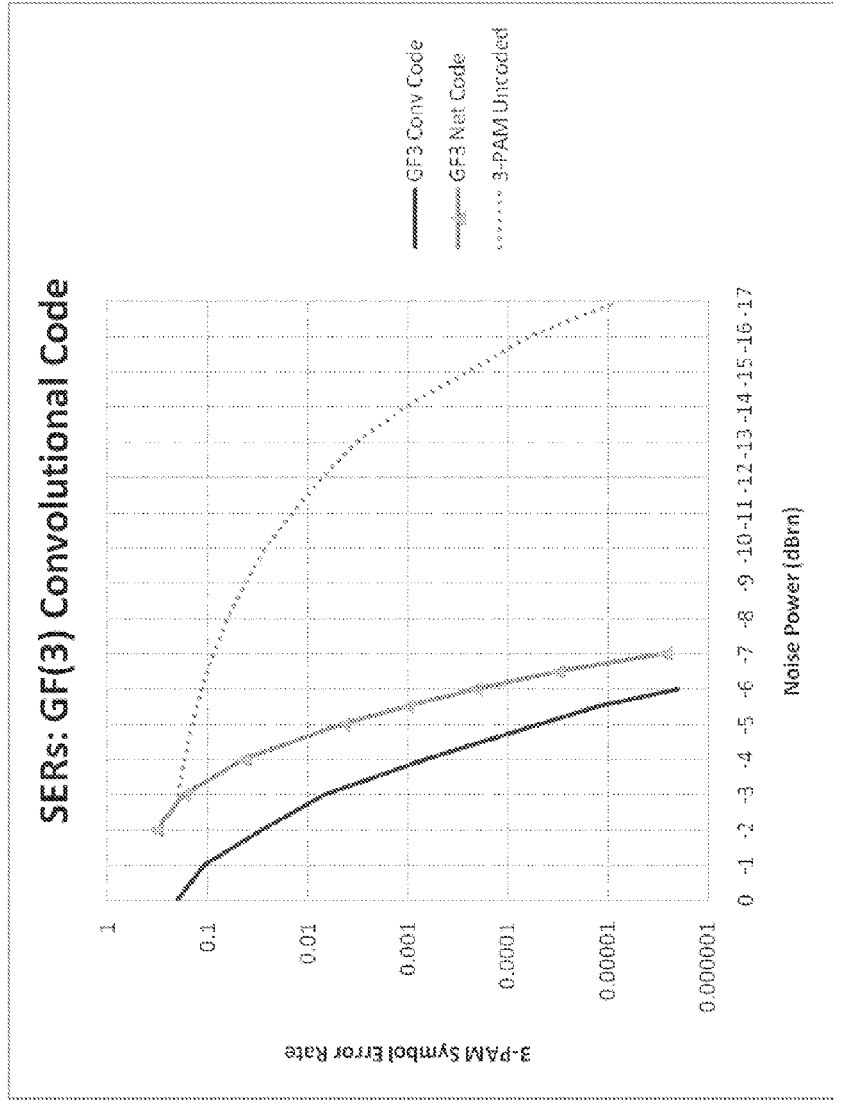
FIG. 10 shows an example symbol error rate comparison of different coding schemes.

FIG. 10 shows an example symbol error rate comparison of different coding schemes. Specifically, FIG. 10 shows symbol error rate comparison among a rate-1/3 constraint length-5 GF(3) trellis code such as polynomials 21022, 20122, and 11122, single link, two-way physical layer network coding using the same GF(3) trellis code, and uncoded 3PAM over a single link.

For the purpose of illustration, it may be assumed that the transmitters transmit at power=2/3 ($M_3=\{-1, 0, +1\}$), with the constellation shown in FIG. 7 (a). In the PNC case, two signals may arrive at the relay simultaneously. The channels have a unity gain that may equal to 1. The noise power may be as indicated in the abscissa with reference level 0 dBrn=2/3. Symbol errors may be measured in PNC receiver. Soft decoding may be used in the Viterbi decoder.

As shown, PNC using trellis code over BPSK may lose about 1 to 2 dB in performance, depending on the SNR. At low BERs, the loss may be about 1 dB. The loss may be attributed to the 5-point constellation in FIG. 7 (b), which may be less reliable than the 3-point BPSK constellation in FIG. 7 (a).

Figure 11:
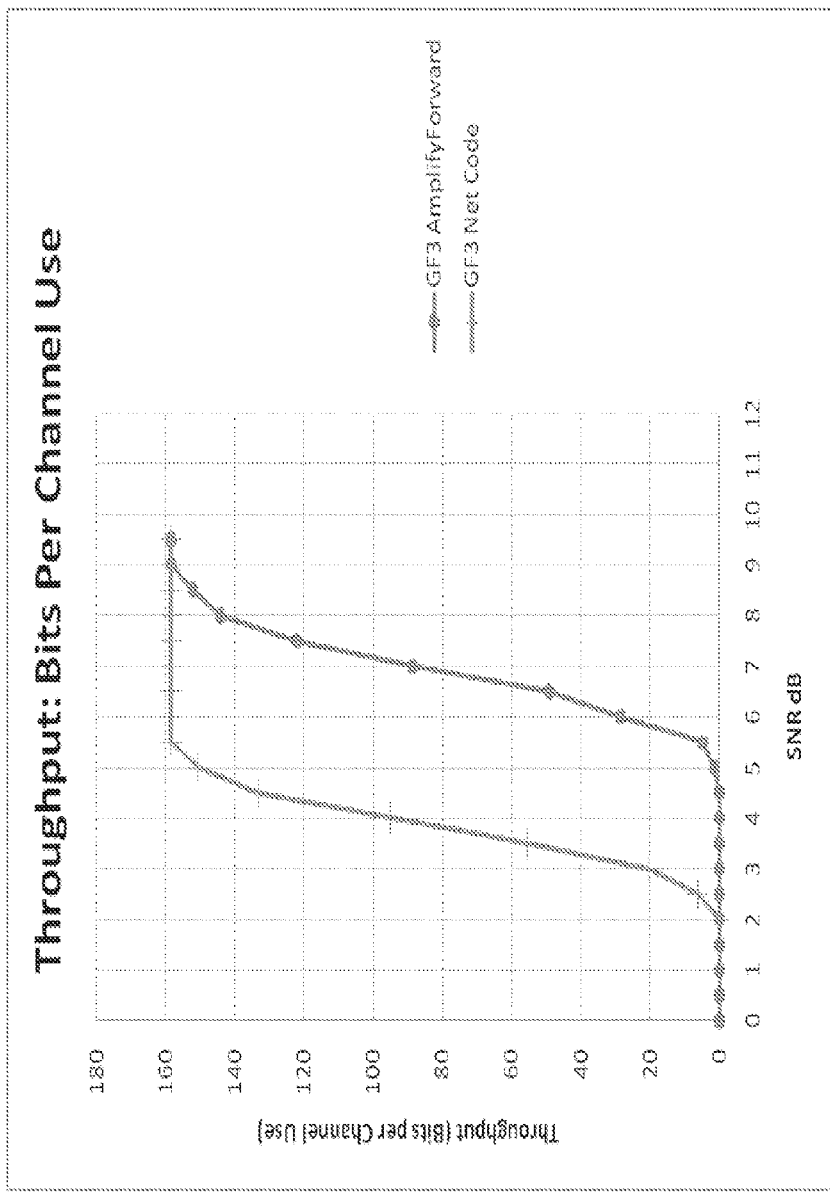
FIG. 11 shows a comparison of throughputs between amplify-and-forward relaying and physical layer coding relaying.

FIG. 11 shows a comparison of throughputs between amplify-and-forward relaying and PNC using the GF(3) convolutional code described above. For example, the packet size may be 100 ternary symbols, or about 158.5 bits. Throughput may be measured as the amount of information successfully exchanged between the WTRUs per channel use. When there is a packet error, the bits may be deemed unsuccessful. The transmitters for the WTRUs and the relay may transmit at power=2/3, with the constellation shown in FIG. 7 (a). The relay may broadcast the signal it received after scaling its transmit power to ⅔. The broadcast may use the same GF(3) convolutional code. The channels may have a unity gain=1. The noise variance at the receivers of the WTRUs and the relay may equal to $$\sigma^2 = \frac{2}{3} 10^{\frac{SNR}{10}}.$$

Soft decoding may be used in the Viterbi decoder in the WTRUs.

As shown, for channel gain of 1, there may be a significant advantage such as about 3 dB with the PNC scheme over amplify-and-forward relaying. For channel gain of less than 1, the advantage of PNC over amplify-and-forward relaying may be greater.

In an embodiment, the signals $x_1$, and $x_2$ from the network entities/nodes may arrive at the relay with identical or similar amplitude and phase. For example, the signal received at the relay may be denoted as $y=x_1+x_2+n$, where n denotes noise and/or interference. In an embodiment, the signals $x_1$, and $x_2$ may arrive at the relay with different amplitude and phase. For example, the signal received at the relay may be denoted as $y=h_1x_1+h_2x_2+n$, where $h_1$ and $h_2$ may represent the channel gains from each of the sender WTRUs, respectively, and n may represent noise and/or interference in the signal. For simplicity, it may be assumed that $h_1$ and $h_2$ are complex scalars. To illustrate how the difference between h1 and h2 may impact channel estimation at the relay's receiver, without losing generality, it may be assumed that the gain on $x_1$ is unity, and the signal received at the relay may be denoted as $y=x_1+hx_2+n$.

Figure 12:
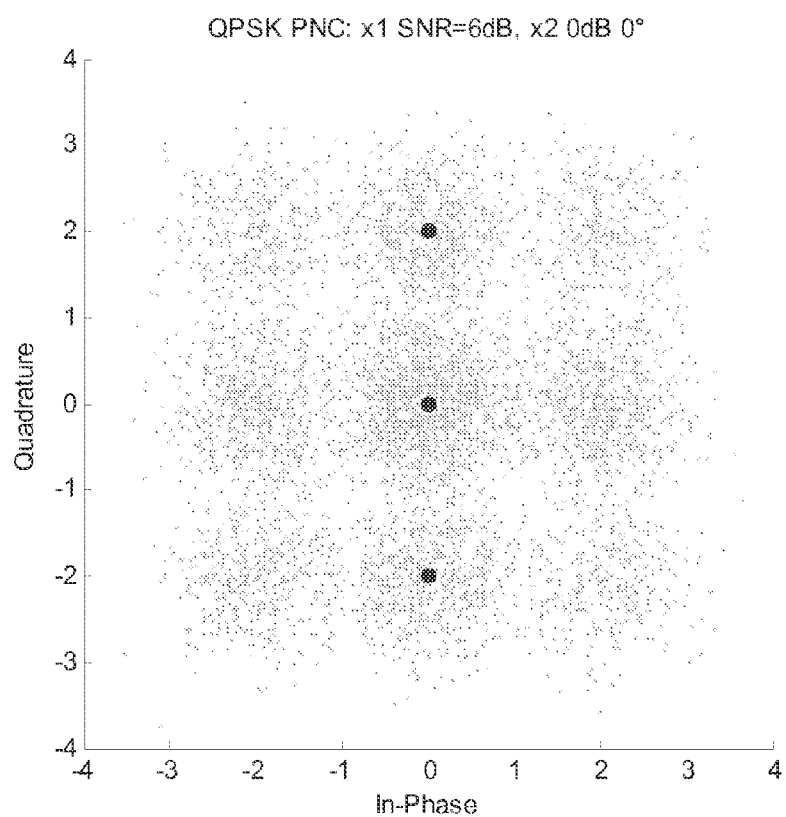
FIG. 12 is a scatter plot of an example signal received at the relay.

FIG. 12 is a scatter plot of the received signal $x_1+x_2+n$, when h=1. The light-shaded dots may represent $y=x_1+x_2+n$. The dark dots may represent the coordinates where the in-phase component of $m_1 \oplus m_2$ encodes 1. The circles may indicate the constellation points where the in-phase component of $m_1 \oplus m_2$ encodes 0. The coordinates of the dark dots and circles may determine how the LLRs are computed for Viterbi decoding. For clarity, the quadrature component is not plotted. The quadrature component may be the in-phase points rotated 90 degrees.

In an embodiment, the gain offset h may be complex. For example, the gain offset h may be expressed using amplitude (dB) and phase (°). The gain offset h may be known to the receiver of the network node or the relay. When the gain offset h is unknown to the receiver, and the receiver may assume the gain offset to be 1.

In an embodiment, the signals from $x_1$, and $x_2$ may be precoded and power-controlled by $h_1^*/|h_1|^2$ and $h_2^*/|h_2|^2$, respectively, such that the signals from the network nodes may arrive at the relay receiver in substantially the same or similar amplitude and in substantially the same or similar phase. For example, the signals from $x_1$, and $x_2$ may be precoded and power-controlled such that the composite signal arriving at the receiver of the relay may be in the form of $y=x_1+x_2+n$.

Figure 13:
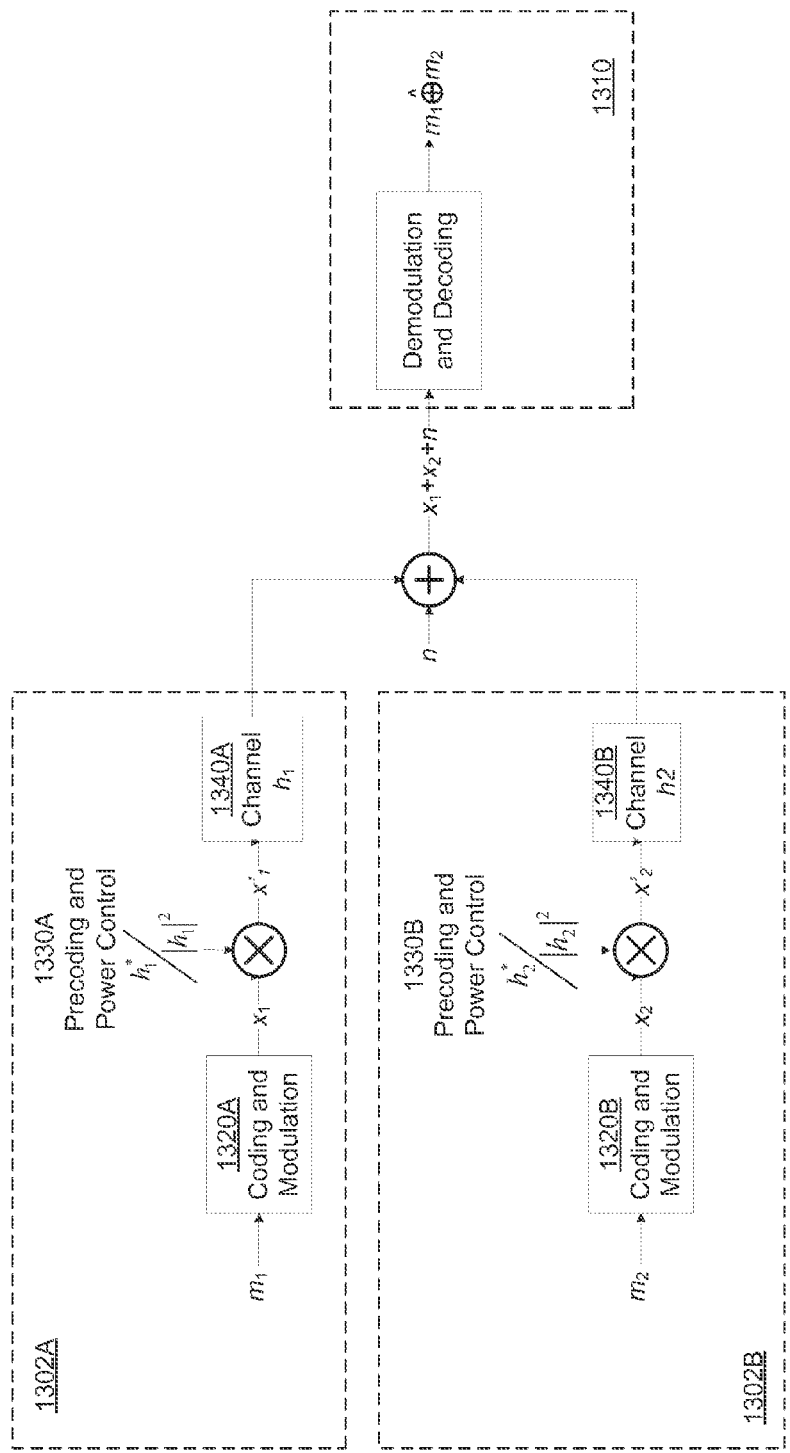
FIG. 13 illustrates example network coding scheme with precoding and power control.

FIG. 13 illustrates example network coding scheme with precoding and power control. As shown, WTRU 1302A and WTRU 1302B may exchange messages via relay 1310. At 1320A, outgoing message $m_1$ may be coded and modulated, and an output signal x1 may be generated in accordance to the procedures described above with respect to FIG. 4B and FIG. 5A. At 1330A, output signal x1 may be precoded and power-controlled by $h^*_1/|h_1|^2$ to generate a scaled output signal x'1. At 1340A, the scaled output signal x'1 may be transmitted via channel h1. As shown, the WTRU 1302B may similarly perform coding and modulation on outgoing message m2 at 1320B, and may perform precoding and power control by applying $h^*_2/|h_2|^2$ to signal x2 and form a scaled signal x'2 for transmission on channel h2. As shown, the relay 1310 may receive a composite signal arriving in the form of $x_1+x_2+n$.

In an embodiment, the knowledge of $h_1$ and $h_2$ may be obtained through feedback from the relay receiver. For example, a reference signal may be embedded in the transmitted signal from each WTRU in code domain or time domain on the same carrier or subcarrier of data signal. The relay receiver may estimate the channel state information from two end nodes independently.

In an embodiment, the knowledge of $h_1$ and $h_2$ may be obtained through channel reciprocity. For example, in the broadcast phase, the relay may transmit a reference signal embedded with the combined data signal. Each WTRU may estimate the channel state information based on the embedded reference signal, and may use the channel state information for precoding and power control of its transmitted signal.

Figure 14:
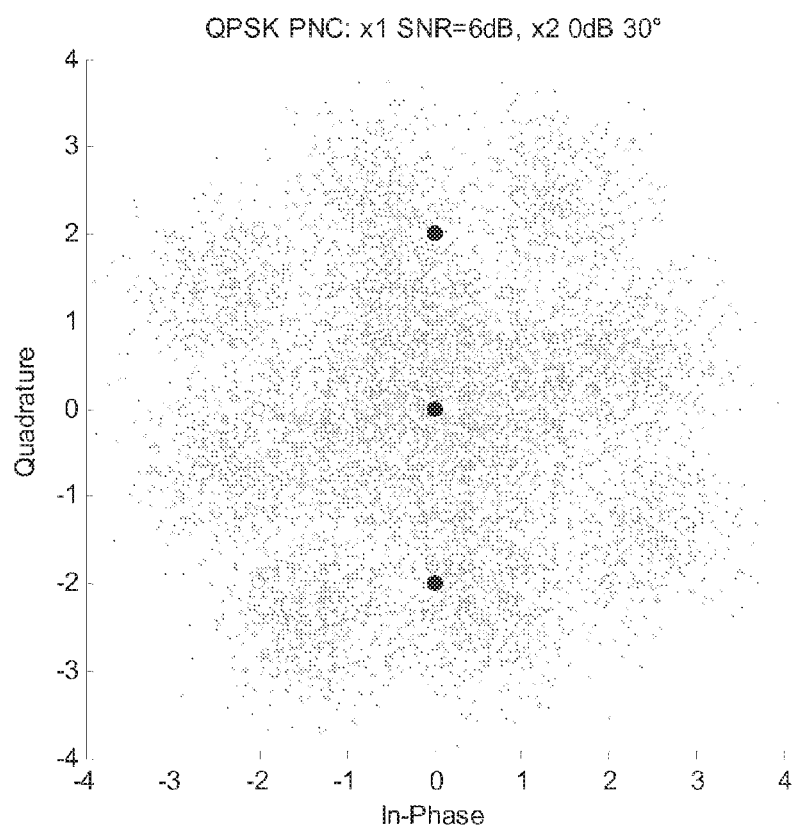
FIGS. 14 and 15 illustrate example scatter plots for the summation constellation of quadrature phase-shift keying (QPSK) when the value of gain offset is unknown.

In an embodiment, performance may be sensitive to channel estimation and precoding errors. FIG. 14 shows an example scatter plot for the summation constellation of QPSK when the value of gain offset is unknown. Specifically, FIG. 14 shows the scatter plot for the summation constellation of QPSK when the two signals, $x_1$ and $x_2$, are offset by 30°, i.e., h=0.866+0.5j. The coordinates of the dark dots and circles may be the same as in the plot of FIG. 12, as the receiver may assume h to be 1.

Figure 15:
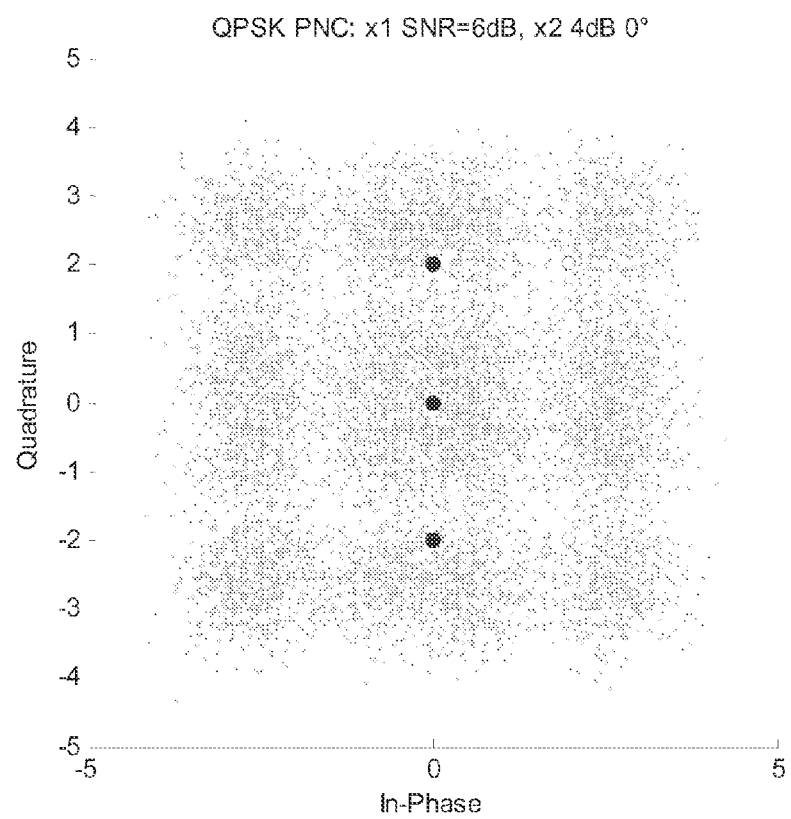

FIG. 15 shows an example scatter plot for the summation constellation of QPSK when the value of gain offset is unknown. Specifically, FIG. 15 shows the scatter plot for the summation constellation of QPSK when the two signals, $x_1$ and $x_2$, are offset by 4 dB, i.e., h=1.5849+0j.

Figure 16:
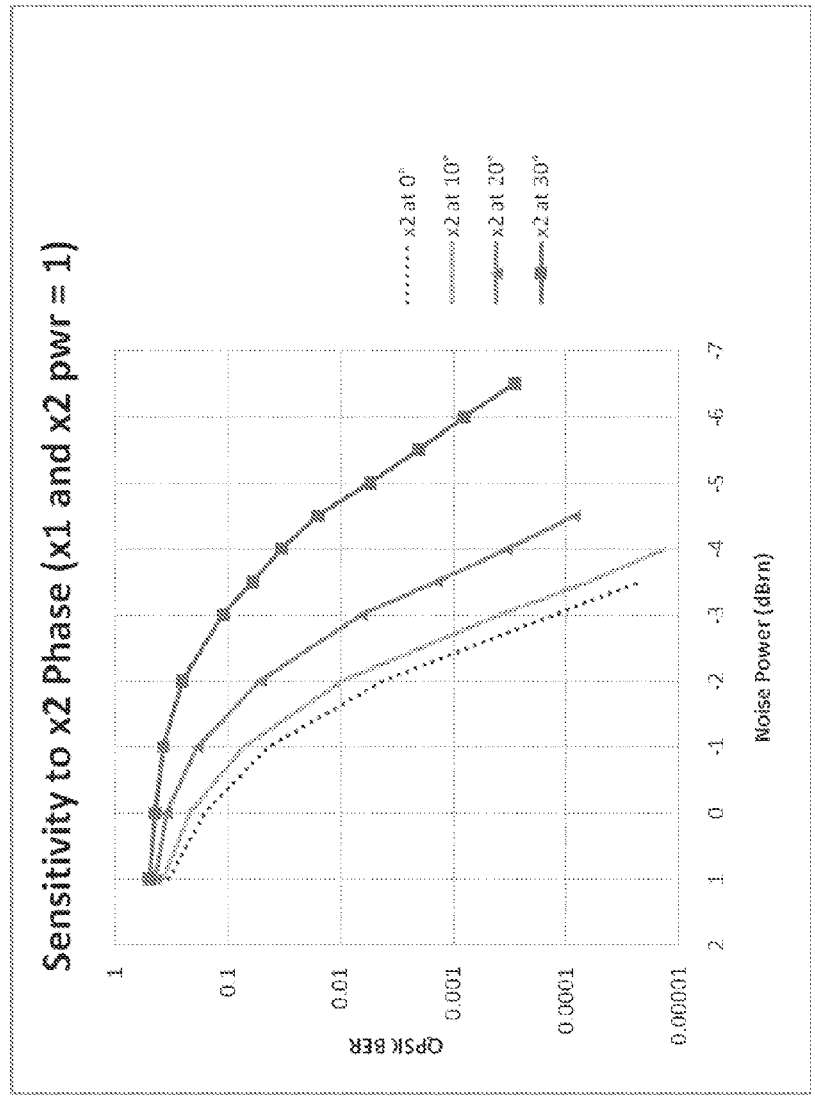
FIG. 16 illustrates the performance impact of phase offset.

FIG. 16 illustrates the performance impact of phase offset. As shown, a non-zero phase may impact the performance. For QPSK, performance degradation may be greater than 30°.

Figure 17:
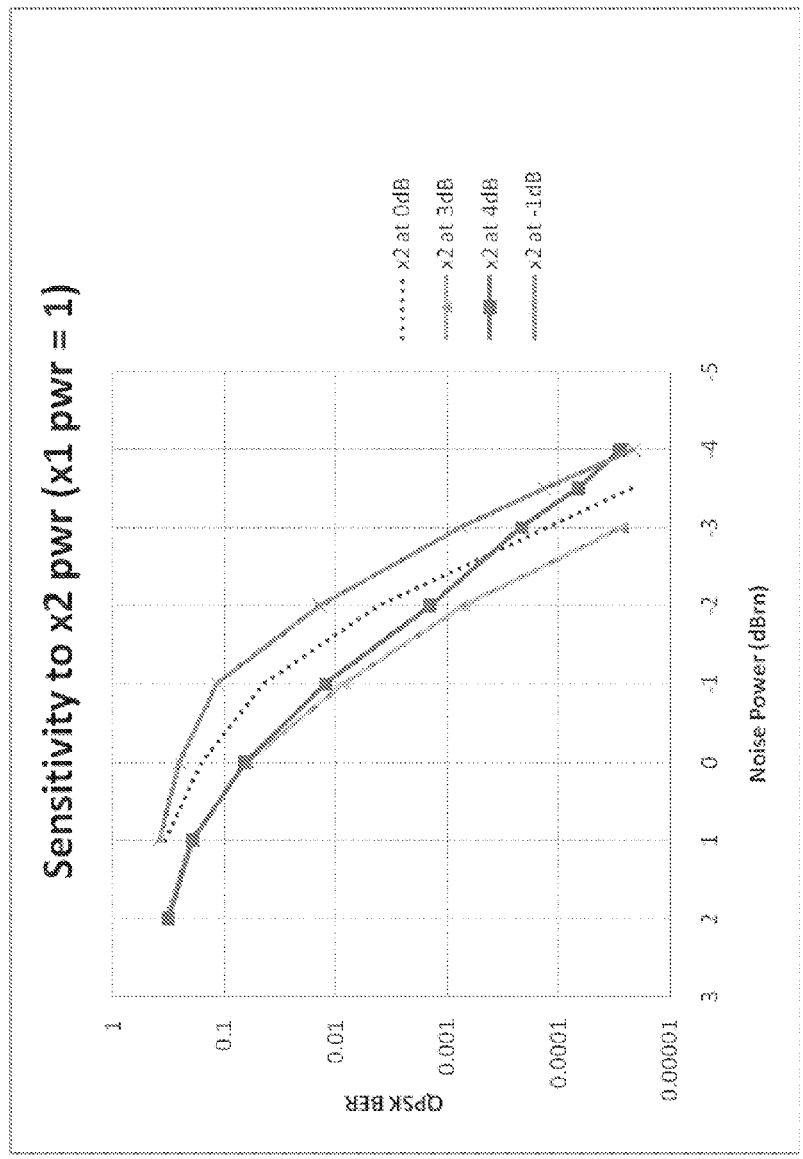
FIG. 17 illustrates the performance impact of amplitude offset.

FIG. 17 illustrates the performance impact of amplitude offset. As shown, when h is −1 dB, the performance may be slightly lower because of reduced SNR for $x_2$. With h>0 dB, performance may be better than h=1. For QPSK, once h reaches 4 dB, performance may start to deteriorate significantly.

In an embodiment, the transmit power and channel state information (CSI) may be known to the receiver. Decoding of PNC may be based on the transmit power and CSI. For example, the LLRs may be computed with the assumption that the coordinates of the constellation points for $m_1 \oplus m_2$ is 0 and $m_1 \oplus m_2$ is 1.

Figure 18:
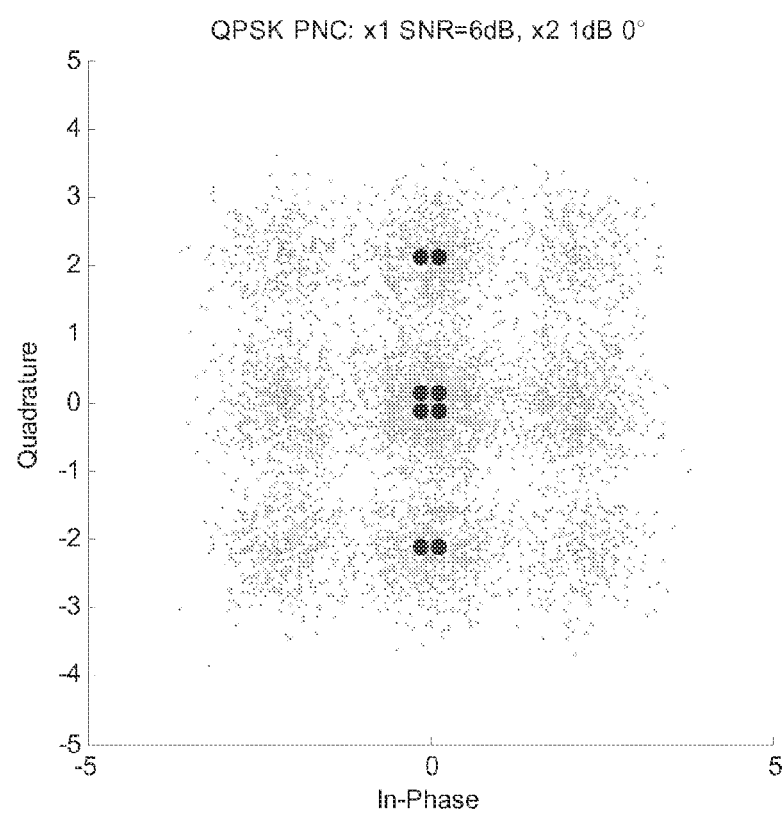
FIGS. 18-20 illustrate example scatter plots for the summation constellation of QPSK.

FIG. 18 illustrates an example scatter plot for the summation constellation of QPSK. In particular, FIG. 18 illustrates an example scatter plot for h=1 dB and 0°, i.e., h=1.122+0j. As shown, the coordinates of the dark dots and the circles are different. The light dots are scattered and may serve as the basis for the LLR computation.

Figure 19:
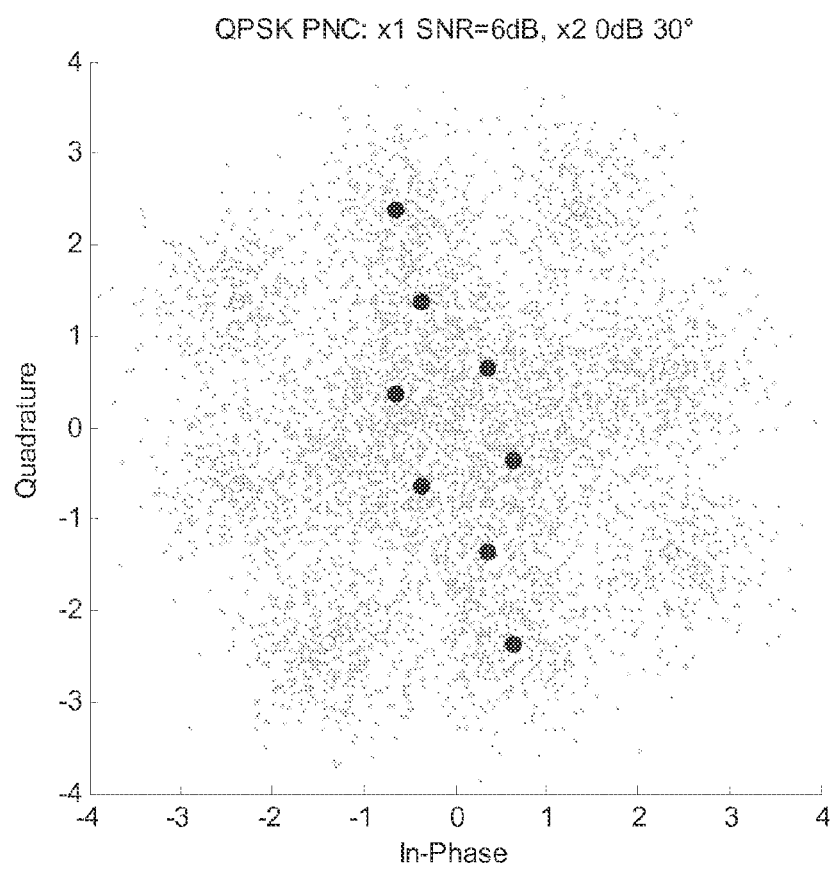

FIG. 19 illustrates an example scatter plot for the summation constellation of QPSK. In particular, FIG. 19 illustrates an example scatter plot for h=0 dB and 30°, i.e., h=0.866+0.5j. As shown, the dark dots and circles are separate. Additive white Gaussian noise (AWGN) performance may be affected due to reduced separation. In an embodiment, there may be 8 dark dots and 8 circles for QPSK. For some h, multiple dots and circles may overlap into one. For some h, the dots and circles can become very close to each other or even overlap, in which case, decoding performance may degrade.

Figure 20:
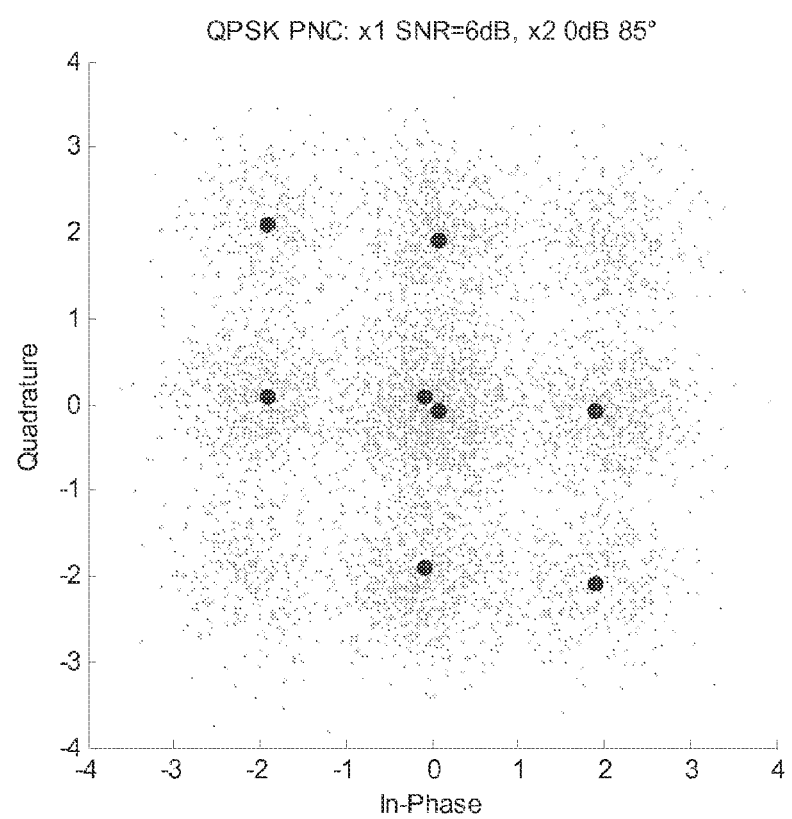

FIG. 20 illustrates an example scatter plot for the summation constellation of QPSK. In particular, FIG. 20 illustrates a scatter plot for h=0 dB and 85°, i.e., h=0.087156+0.99619j. As shown, the dark dots and circles are very close to each other, and may overlap completely at 90°.

In an embodiment, when $|\angle h|>45°$, various combinations of in-phase and quadrature phase of $x_1$ and $x_2$ may be decoded. For example, denoting I(x) as the in-phase component and Q(x) the quadrature component of complex signal x, when $45°\le h<45°$, $I(x_1)+I(x_2)$ and $Q(x_1)+Q(x_2)$ may be decoded for QPSK. When $45°\le h\le 135°$, $I(x_1)-Q(x_2)$ and $Q(x_1)+I(x_2)$ may be decoded for QPSK. When $135°\le h<225°$, $I(x_1)-I(x_2)$ and $Q(x_1)-Q(x_2)$ may be decoded for QPSK. When $225°\le h<315°$, $I(x_1)+Q(x_2)$ and $Q(x_1)-I(x_2)$ may be decoded for QPSK. For example, when h is greater than or equal to 45° and less than 315°, the relay may perform a GF(2) addition of $m_1$ and a permutation of $m_2$ or $-m_2$. In the broadcast phase, the relay may inform the network nodes of the combination being used. The combination may be sufficiently informative such that $m_2$ and $m_1$ may be decoded by the network nodes.

Figure 21:
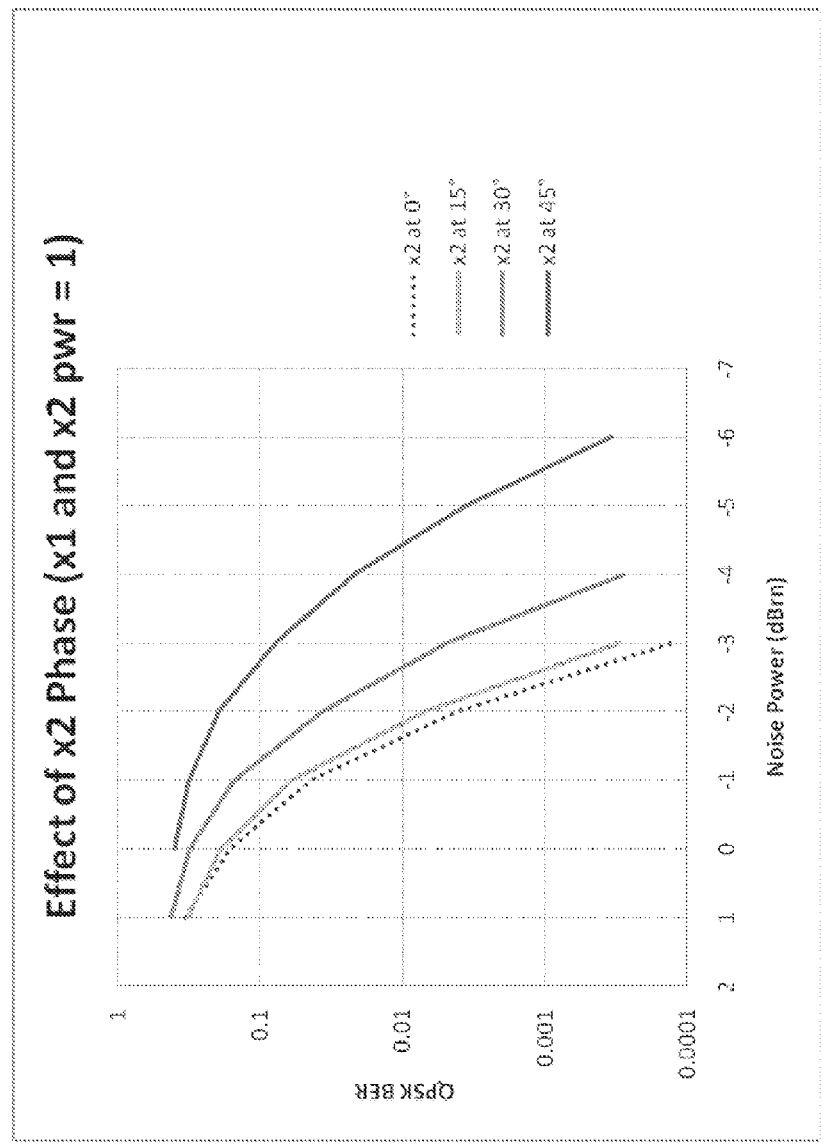
FIG. 21 illustrates the effect of decoding combinations of in-phase and quadrature phase of the messages.

FIG. 21 illustrates the effect of decoding combinations of in-phase and quadrature phase of the messages. FIG. 21 shows the effect of phase offset up to 45°.

Figure 22:
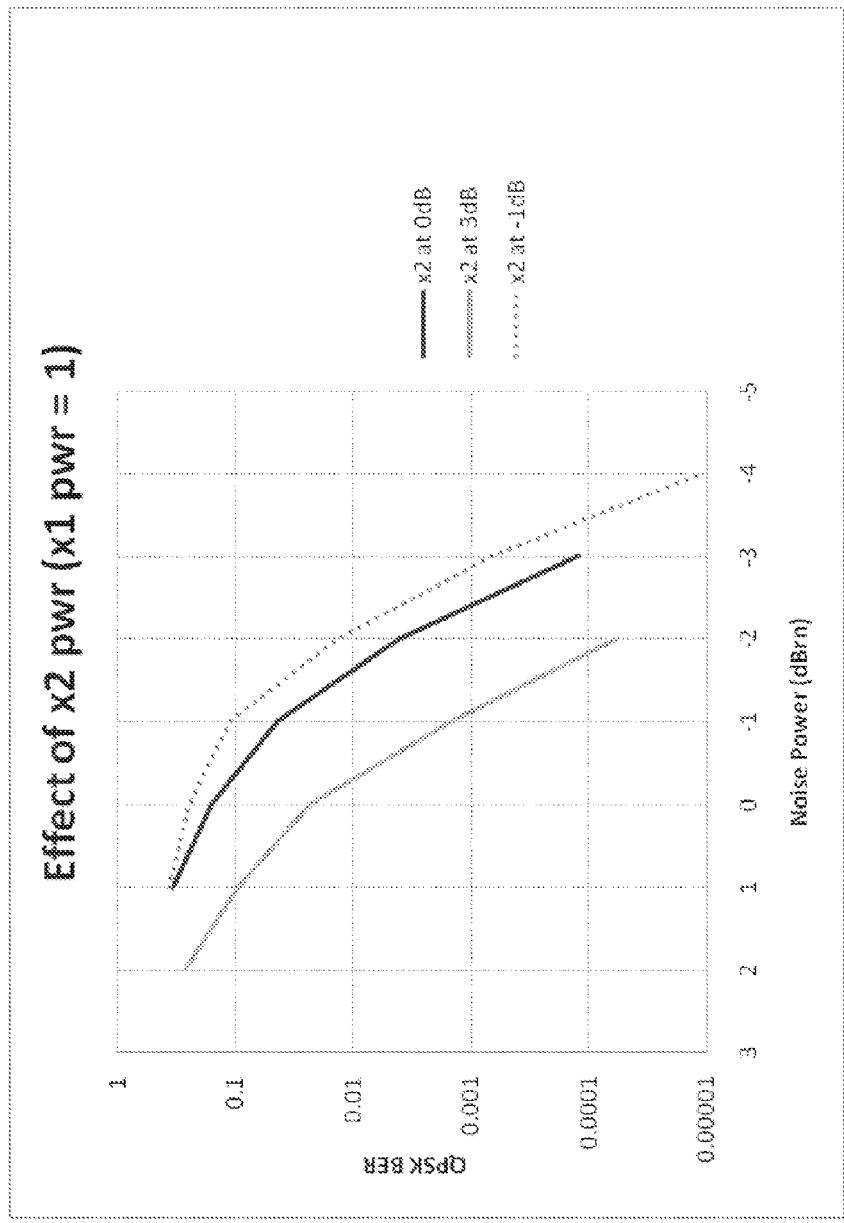
FIG. 22 illustrates the effect of gain offset.

FIG. 22 illustrates the effect of gain offset. As shown, for $|h|>0$ dB, the performance may be improved, h gain generally does not adversely affect PNC in QPSK.

In an embodiment, when the amplitude and phase of the signals from the sender WTRUs differ by a predetermined threshold, successive interference cancellation (SIC) may be performed.

For example, the relay may decode the two signals by treating the weaker signal as noise and decoding the stronger signal. The relay may encode the codeword decoded from the stronger signal, and may derive the weaker signal by subtract the encoded codeword from the superimposed signal. In an embodiment, the two signals from the sender WTRUs may not be aligned in phase.

In an embodiment, when the difference between the amplitude and phase of the signals from the sender WTRUs is below a predetermined threshold, SIC may not be performed, and the superposition of the two signals may be decoded.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method for exchanging messages through a relay, the method comprising:
    receiving a field order for encoding an outgoing message, the field order being a prime number determined based on a channel condition;
    encoding the outgoing message with linear codes over a field of the field order; and
    transmitting a signal carrying the encoded outgoing message.

2. The method of claim 1, further comprising:
    receiving a signal carrying a composite message; and
    extracting an incoming message from the composite message using linear subtraction over the field of the field order.

3. The method of claim 2, wherein the composite message comprises a summation of the outgoing message and the incoming message over the field of the field order.

4. The method of claim 2, wherein the incoming message is extracted by subtracting the outgoing message from the composite message over the field of the field order.

5. The method of claim 1, wherein the outgoing message is intended for a network node, the method further comprising:
    precoding and power controlling the signal based on channel phase and gain offsets such that the signal is receivable by the relay in the same amplitude and the same phase as a signal from the network node.

6. The method of claim 1, wherein the value of the field order is a prime number larger than 2.

7. The method of claim 1, wherein the field is a finite field.

8. The method of claim 1, further comprising:
    modulating the encoded outgoing message using pulse amplitude modulation (PAM) having the field order number of points in a PAM.

9. The method of claim 1, further comprising:
    modulating the encoded outgoing message using quadrature and amplitude modulation (QAM) having the square of the field order number of points in a QAM.

10. A method for relaying message exchange between two network nodes, the method comprising:
    determining a field order based on a channel condition, the field order being a prime number;
    receiving a first signal carrying a summation of a first message from a first network node and a second message from a second network node;
    decoding the received signal to generate a composite message with linear codes over a field of the determined field order; and
    transmitting a second signal carrying the composite message.

11. The method of claim 10, wherein the channel condition comprises at least one of a signal to noise ratio or a signal to interference and noise ratio.

12. The method of claim 10, further comprising:
    signaling the determined field order to the first and the second network nodes.

13. The method of claim 10, further comprising:
    computing a plurality of soft bits for the received signal.

14. The method of claim 10, further comprising:
    performing successive interference cancellation when channel gains associated with the first and the second network nodes to the relay differ by a predetermined threshold.

15. The method of claim 10, further comprising:
    modulating the composite message using pulse amplitude modulation (PAM) having the field order number of points in a PAM.

16. The method of claim 10, further comprising:
    modulating the composite message using quadrature and amplitude modulation (QAM) having the square of the field order number of points in a QAM.

17. The method of claim 10, wherein the second signal carrying the composite message is broadcasted to the first and the second network nodes.

18. A wireless transmit and receive unit (WTRU) for exchanging messages through a relay, the WTRU comprising:
    a transceiver configured to receive a field order for encoding an outgoing message, the field order being a prime number and determined by the relay based on a channel condition; and
    a processor configured to encode the outgoing message with a linear code over the finite field of the received field order, wherein the transceiver is further configured to transmit a signal carrying the encoded message.

19. The WTRU of claim 18, wherein the processor is further configured to modulate the encoded outgoing message using pulse amplitude modulation (PAM) having the field order number of points in a PAM.

20. The WTRU of claim 18, wherein the processor is further configured to modulate the encoded outgoing message using quadrature and amplitude modulation (QAM) having the square of the field order number of points in a QAM.

21. The WTRU of claim 18, wherein the transceiver is further configured to receive a signal carrying a composite message, and the processor is further configured to extract an incoming message from the composite message using linear subtraction over the field of the field order.

22. The WTRU of claim 21, wherein the composite message comprises linear summation of the outgoing message and the incoming message over the field of the field order.

23. The WTRU of claim 21, wherein the processor is further configured to subtract the outgoing message from the composite message over the field of the field order.

24. The WTRU of claim 18, wherein the outgoing message is intended for a network node, and the processor is further configured to precode and power control the signal carrying the encoded message based on a channel gain offset such that the signal is receivable by the relay in similar amplitude and similar phase as a signal from the network node.

25. A wireless transmit and receive unit (WTRU) for relaying message exchange between two network nodes, the WTRU comprising:
    a transceiver configured to receive a first signal carrying a summation of a first message from a first network node and a second message from a second network node; and
    a processor configured to:
        determine a field order based on a channel condition, the field order being a prime number; and decode the received signal to generate a composite message with linear codes over a field of the determined field order, wherein the transceiver is further configured to transmit a second signal carrying the composite message.

26. The WTRU of claim 25, wherein the transceiver is further configured to signal the determined field order to the two network nodes.

27. The WTRU of claim 25, wherein the processor is further configured to compute a soft bit for the received signal.

28. The WTRU of claim 25, wherein the processor is further configured to perform successive interference cancellation when channel gains associated with the first and the second network nodes differ by a predetermined threshold.

29. The WTRU of claim 25, wherein the processor is further configured to modulate the composite message using pulse amplitude modulation (PAM) having the field order number of points in a PAM.

30. The WTRU of claim 25, wherein the processor is further configured to modulate the composite message using quadrature and amplitude modulation (QAM) having the square of the field order number of points in a QAM.

31. The WTRU of claim 25, wherein the transceiver is further configured to broadcast the second signal carrying the composite message.

* * * * *